(12) United States Patent
Guiliano et al.

(10) Patent No.: US 9,542,449 B2
(45) Date of Patent: Jan. 10, 2017

(54) COLLABORATION AND ANALYSIS SYSTEM FOR DISPARATE INFORMATION SOURCES

(71) Applicant: Search For Yeti, LLC, Arlington, VA (US)

(72) Inventors: Jay Guiliano, Arlington, VA (US); Aaron Levine, Houston, TX (US); Frank Rathgeber, Alexandria, VA (US)

(73) Assignee: Search For Yeti, LLC, Arlington, VA (US)

( * ) Notice: Subject to any disclaimer, the term of this patent is extended or adjusted under 35 U.S.C. 154(b) by 243 days.

(21) Appl. No.: 13/840,292

(22) Filed: Mar. 15, 2013

(65) Prior Publication Data

US 2016/0048516 A1 Feb. 18, 2016

Related U.S. Application Data

(60) Provisional application No. 61/621,902, filed on Apr. 9, 2012.

(51) Int. Cl.
G06F 17/30 (2006.01)
G06Q 10/06 (2012.01)
G06Q 10/10 (2012.01)

(52) U.S. Cl.
CPC ......... G06F 17/3053 (2013.01); G06Q 10/063 (2013.01); G06Q 10/10 (2013.01)

(58) Field of Classification Search
CPC .......................... G06F 17/30997; G06G 10/10
USPC ........................................ 707/705, 636, 772
See application file for complete search history.

(56) References Cited

U.S. PATENT DOCUMENTS

| | | | |
|---|---|---|---|
| 6,144,962 | A | 11/2000 | Weinberg et al. |
| 6,377,961 | B1 | 4/2002 | Ryu |
| 6,529,903 | B2 | 3/2003 | Smith et al. |
| 6,678,681 | B1 | 1/2004 | Brin |
| 6,915,254 | B1 | 7/2005 | Heinze et al. |
| 7,650,330 | B1 | 1/2010 | Brin |
| 7,991,624 | B2 | 8/2011 | Malone |
| 8,065,307 | B2 | 11/2011 | Haslam et al. |
| 8,892,547 | B2 | 11/2014 | Lundberg |
| 2004/0078192 | A1 | 4/2004 | Poltorak |
| 2005/0171926 | A1* | 8/2005 | Thione et al. ................ 707/1 |
| 2006/0173903 | A1 | 8/2006 | Zimmerman et al. |
| 2006/0190807 | A1 | 8/2006 | Tran |
| 2006/0248055 | A1 | 11/2006 | Haslam et al. |
| 2006/0248094 | A1 | 11/2006 | Andrews et al. |
| 2006/0294130 | A1 | 12/2006 | Soo et al. |

(Continued)

OTHER PUBLICATIONS

Mornini, Joelle; Annotation Problems within a Patent File History and Solutions With Patent Workbench®, Jan. 23, 2013, pp. 1-3, Patent Workbench Blog.

(Continued)

*Primary Examiner* — Mohammad S Rostami
(74) *Attorney, Agent, or Firm* — Panovia Group LLP

(57) ABSTRACT

An advanced relational database and user interface system used for the evaluation, analysis and generation of specialized reports in any of a plurality data analysis environments. The database and analysis system can be utilized for many purposes, but particularly and preferably to support the analysis of patent claims and more specifically claim construction, infringement, written description, invalidity and/or patentability, among other matters of intellectual property litigation and analysis.

7 Claims, 20 Drawing Sheets

(56) References Cited

U.S. PATENT DOCUMENTS

| | | | |
|---|---|---|---|
| 2007/0073653 | A1 | 3/2007 | Raab |
| 2007/0136116 | A1 | 6/2007 | Germeraad et al. |
| 2007/0198578 | A1 | 8/2007 | Lundberg et al. |
| 2007/0288256 | A1 | 12/2007 | Speier |
| 2008/0052358 | A1* | 2/2008 | Beaven et al. ............... 709/205 |
| 2008/0086507 | A1 | 4/2008 | Szygenda et al. |
| 2009/0083049 | A1 | 3/2009 | Sciarrino et al. |
| 2009/0259459 | A1 | 10/2009 | Ceusters et al. |
| 2010/0088292 | A1* | 4/2010 | Tirpak et al. ............... 707/705 |
| 2010/0180223 | A1 | 7/2010 | Speier |
| 2011/0072342 | A1 | 3/2011 | Tran |
| 2012/0102427 | A1 | 4/2012 | Fenster et al. |
| 2012/0109642 | A1 | 5/2012 | Stobbs et al. |
| 2012/0116989 | A1 | 5/2012 | Lai et al. |
| 2012/0130993 | A1 | 5/2012 | Lundberg et al. |
| 2013/0086049 | A1 | 4/2013 | Lundberg et al. |
| 2013/0262320 | A1* | 10/2013 | Makanawala et al. ....... 705/304 |

OTHER PUBLICATIONS

Landon IP; Patent Workbench brochure; 2011, pp. 1-4, www.patentworkbench.com.
Patent Workbench: A Nail Gun, Not A Hammer, World Intellectual Property Review Jan./Feb. 2012, pp. 1-4, www.worldipreview.com.
Shih-Yao Yang, Von-Wun, Soo. 2012. Extract Conceptual Graphs from Plain Texts in Patent Claims, Journal of Engineering Applications of Artificial Intelligence. 25(4) 874-87.
Sheremetyeva, S. 2003. Natural language analysis of patent claims. ACL workshop on patent corpus processing. Sapporo, Japan. Jul. 12, p. 8.
Smith, John C., Esq.; Patent Claims Comparison Report: Date Generated: Apr. 6, 2004, pp. 1-11, PatentCafe® Intellectual Capital Office Suite, http://www.IAMcafe.com.
Lundberg, Steven, W.; McCrackin, Ann M.; Meat and Potatoes or Cotton Candy? A Survey of Patent Analytics Tools and Services, 2009, pp. 1-67, Schwegman, Lundberg & Woessner, P.A.
Cimiano, Phillipp; Hotho, Andreas; Staab, Steffen; Learning Concept Hierarchies from Text Corpora using Formal Concept Analysis, Journal of Artificial Intelligence Research 24 (2005), pp. 305-339.
Gibbs, Andy; Latent Semantic Analysis: New Intellectual Property Data Search Technology for Non-Obvious Licensing Opportunities, pp. 1-4, LES 2004 Winter Meeting, http://www.patentcafe.com.
Next Generation Freedom-to-Opeate, Providing the tool and process for patent savvy, cost effective business decisions, 2011, pp. 1-17, Lucid Patent, LLC.
Kacsuk, Zsofia; The mathematics of patent claim analysis, Artif Intell Law (2011) 19, pp. 263-289, Springer.
Sinha, Mahish; Optimizing Corporate Intellectual Property Research, 2008, pp. 1-5, www.patentinsightpro.com.
Artificial Intelligence Patent Management, date unknown, pp. 1-4, ProSearch(tm), www.pantrosip.com.
Synchronizing IP Strategy to Corporate Strategy, 2009, pp. 1-4, Patent iNSIGHT Pro.
Organizing Enterprise Intellectual Property Knowledge Management (IPKM), 2009, pp. 1-5, Patent iNSIGHT Pro.
Parchomovsky, Gideon; Wagner, R. Polk; Patent Portfolios, date unknown, pp. 1-78, Wagner & Parchomovsky.
Gibbs, Andy; PatentCafe Streamlines Claims Test/Claims Chart Development Web-based Claims Charting Breaks Long Tradition of Hand Comparison, May 16, 2014, pp. 1-2, http://www.mondaq.com/unitedstates/article.asp?articleid=25889.
Patriot Charts, Centralize case organization and visualize patent enforcement strategy, date unknown, pp. 1-2.
Chart Once, Use Forever; Next Generation Freedom-to-Opeate, Providing the tool and process for patent savvy, cost effective business decisions, 2011, pp. 1-21, Schwegman, Lundberg, Woessner.
Hollunder, Bernard; Nutt, Werner; Subsumption Algorithms for Concept Languages, date unknown, pp. 1-34, German Research Center for Artificial Intelligence.
Zavitsanos, Elias; Paliouras, Georgios; Vouros; George A.; Petridis, Sergios; Discovering Subsumption Hierarchies of Ontology Concepts from Text Corpora, date unknown, pp. 1-7, Institute of Informatics and Telecommunications, NCSR "Demokritos", Greece; Department of Information and Communication Systems Engineering, AI-Lab University of Aegean, Greece.
Sinha, Mahish; Text Clustering on Patents, 2009, pp. 1-8, www.patentinsightpro.com.
Chart Once, Use Forever, Next Generation Freedom-to-Opeate, Providing the tool and process for patent savvy, cost effective business decisions, 2011, pp. 1-21, Schwegman, Lundberg, Woessner.
Jagalla, Christopher; Welcome to the Patent Workbench Blog!, Jul. 12, 2011, pp. 1- 3, Patent Workbench Blog.
Jagalla, Christopher; Patent WorkbenchTM: A New File History Tool, Jul. 20, 2011, pp. 1-3, Patent Workbench Blog.
Jagalla, Christopher; Compare Every Version of a Claim with the Patent WorkbenchTM Reader Claims Matrix, Oct. 24, 2011, pp. 1-4, Patent Workbench Blog.
Mornini, Joelle; Export Office Actions and Responses in One PDF Document Through Patent Workbench®, Feb. 1, 2012, pp. 1-3, Patent Workbench Blog.
Mornini, Joelle; The Main Export Window: Create a Custom PDF of Selected Papers in Patent Workbench®, Feb. 8, 2012, pp. 1-3, Patent Workbench Blog.
Mornini, Joelle; Collaborative Notes on the Patent File History through Patent Workbench®, Feb. 29, 2012, pp. 1-3, Patent Workbench Blog.
Mornini, Joelle; A Revolutionary Claims Comparison Tool: The Evolved Claim TM Report on Patent Workbench®, Mar. 7, 2012, pp. 1-4, Patent Workbench Blog.
Mornini, Joelle; Claim Comparison: Another Advanced Claims Tool on Patent Workbench®, 2012, pp. 1-3, Patent Workbench Blog.
Mornini, Joelle; What You Get for Free by Downloading the Patent Workbench® Reader, Mar. 21, 2012, pp. 1-3, Patent Workbench Blog.
Mornini, Joelle; The Help Features on Patent Workbench®, Mar. 28, 2012, pp. 1-4, Patent Workbench Blog.
Mornini, Joelle; The Advanced PDF Viewer on Patent Workbench®, Apr. 11, 2012, pp. 1-4, Patent Workbench Blog.
Mornini, Joelle; Export A Variety of Claims Reports on Patent Workbench®, Apr. 18, 2012, pp. 1-3, Patent Workbench Blog.
Mornini, Joelle; A Multitude of Search Options on Patent Workbench® Reader, Apr. 25, 2012, pp. 1-4, Patent Workbench Blog.
Mornini, Joelle; Secure Collaboration Options on Patent Workbench®, May 3, 2012, pp. 1-2, Patent Workbench Blog.
Mornini, Joelle; Patent Workbench® Featured In World Intellectual Property Review!, Jun. 13, 2012, pp. 1-3, Patent Workbench Blog.
Mornini, Joelle; Add Your Own References to a Patent File History on Patent Workbench®!, Jun. 20, 2012, pp. 1-3, Patent Workbench Blog.
Mornini, Joelle; Workflow for Ordering and Using Patent Workbench®, Jul. 18, 2012, pp. 1-2, Patent Workbench Blog.
Mornini, Joelle; Top 4 Patent Workbench® Text Comparison Features, Jul. 25, 2012, pp. 1-4, Patent Workbench Blog.
Mornini, Joelle; The Power of Patent Workbench®, Aug. 1, 2012, pp. 1-2, Patent Workbench Blog.
Mornini, Joelle; Top 5 Export Features on Home About Patent Workbench®, Aug. 15, 2012, pp. 1-4, Patent Workbench Blog.
Mornini, Joelle; The Tools That Patent Attorneys Asked For: Clain Tree Export and "Select Papers" Tab, Aug. 24, 2012, pp. 2-4, Patent Workbench Blog.
Mornini, Joelle; Work With Patent File Histories and Claims in a Whole New Way!, Aug. 29, 2012, pp. 1-3, Patent Workbench Blog.
Jagalla, Christopher; Cutting-Edge Efficiency with Patent WorkbenchTM: An Interview with Product Manager George Shreck, Aug. 30, 2012, pp. 1-3, Patent Workbench Blog.
Mornini, Joelle; 4 Unique Organization Tools for Patent File Home About History Information, Sep. 5, 2012, pp. 1-4, Patent Workbench Blog.

(56) References Cited

OTHER PUBLICATIONS

Mornini, Joelle; Speed Up Claim Construction with the Advanced Search Tools Available in Patent Workbench®, Sep. 19, 2012, pp. 1-4, Patent Workbench Blog.

Mornini, Joelle; 3 Ways to Annotate A Patent File History, Oct. 3, 2012, pp. 1-4, Patent Workbench Blog.

Mornini, Joelle; Demonstration: Search for a Phrase in a Patent File History through Patent Workbench®, Oct. 17, 2012, pp. 1-4, Patent Workbench Blog.

Mornini, Joelle; Demonstration: Create a Customized Index of Patent File History Papers with Patent Workbench®, Nov. 14, 2012, pp. 1-4, Patent Workbench Blog.

Mornini, Joelle; Demo—Add and Search a Reference with Patent Workbench®, Nov. 28, 2012, pp. 1-4, Patent Workbench Blog.

Mornini, Joelle; Demo—Create a PDF of Selected Patent File History Papers with Patent Workbench®, Dec. 12, 2012, pp. 1-3, Patent Workbench Blog.

Mornini, Joelle; Problems with Navigating a Patent File History and Solutions With Patent Workbench®, Dec. 26, 2012, pp. 1-3, Patent Workbench Blog.

Mornini, Joelle; Problems with Searching a Patent File History & References and Solutions With Patent Workbench®, Jan. 9, 2013, pp. 1-4, Patent Workbench Blog.

* cited by examiner

```
PATDEK                                                    CLOSE WINDOW
┌─────────────────────────────────────────────────────────────────────┐
│                        CREATE A NEW USER                            │
│     FIRST [      ]   LAST [      ]    EMAIL [      ]                │
│     PASSWORD [      ]  -- ACCESS LEVEL -- [↕]   (CREATE USER)       │
├─────────────────────────────────────────────────────────────────────┤
│                           ASSIGN A USER                             │
│      (THERE ARE NO USERS WITHIN YOUR DOMAIN THAT CAN BE ADDED)      │
├─────────────────────────────────────────────────────────────────────┤
│  LIST OF USERS THAT HAVE ACCESS TO THE WALKER DIGITAL - 7,236,942 (PRE-SALE) CASE │
│           (CLICK THE STATUS LINK TO TURN USER'S RIGHT ON/OFF)       │
│     | NAME              | ACCESS LEVEL | STATUS | DELETE |          │
│  1. | JAY GUILIANO      | GATE KEEPER  | ON     | N/A    |          │
│  2. | FRANK RATHGEBER   | GATE KEEPER  | ON     | N/A    |          │
└─────────────────────────────────────────────────────────────────────┘
```

*FIG. 2A*

```
┌───────────────────────────────────────────────────────────────────┐
│ CASE ADMINISTRATION                                               │
│                     ┌─ WALKER DIGITAL - 7,236,942 (PRE-SALE): CASE ADMINISTRATION ─┐
│   START A NEW CASE  │ MAINTENANCE MODE FOR THIS CASE...           │
│                     │ MANAGE ACCESS TO THIS CASE                  │
│      ACTIVE CASES   │ RENAME THIS CASE                            │
│                     │ DEFINE BATES NUMBERING                      │
│    INACTIVE CASES   └─────────────────────────────────────────────┘
│                     ┌─ WALKER DIGITAL - 7,236,942 (PRE-SALE): PATENTS & CLAIMS ─┐
│            LOGOUT   │ ADD A PATENT                                │
│                     │ 7236942  PREVIEW | PROPERTIES | CLAIM CHART | CLAIM REPORT |
│                     │          ADD CLAIM | MANAGE & VIEW PDFS     │
│                     └─────────────────────────────────────────────┘
└───────────────────────────────────────────────────────────────────┘
```

*FIG. 2B*

PATDEK | CLOSE WINDOW

U.S. PAT. 7,236,942

CLAIM 1 [A]  READ LIMITATION | MANAGE ASSOCIATIONS
 SELLING ACTIVITY: [PREAMBLE] SOFTWARE TO SELL SUBSTITUTE PRODUCT

CLAIM 1 [B]  READ LIMITATION | MANAGE ASSOCIATIONS
 SELLING ACTIVITY: POS TERMINAL
 SELLING ACTIVITY: RECEIVE TRANSACTION DATA RE OFFERED PRODUCT

CLAIM 1 [C]  READ LIMITATION | MANAGE ASSOCIATIONS
 SELLING ACTIVITY: DETERMINE SUBSTITUTE PRODUCT BY REMOTE SERVER
 SELLING ACTIVITY: TRANSMIT OFFERED PRODUCT DATA TO REMOTE SERVER

CLAIM 1 [D]  READ LIMITATION | MANAGE ASSOCIATIONS
 SELLING ACTIVITY: OFFER SUBSTITUTE PRODUCT TO CONSUMER
 SELLING ACTIVITY: RECIVE SUBSTITUTE PRODUCT INFO FROM REMOTE SERVER

FIG. 5

RENAME GROUP/CONCEPTS AS NECESSARY:
50 CHARACTER LIMIT FOR GROUP/CONCEPT NAMES, 100 CHARACTER LIMIT FOR NOTES.
NOTES ARE USED TO FURTHER DEFINE THE CONCEPT AND SERVE AS ADDITIONAL INFORMATION FOR THE END-USER.

| SELLING ACTIVITY | |
|---|---|
| CONCEPT 1. | RECEIVE TRANSACTION DATA RE OFFERED PRO |
| NOTES 1. | |
| CONCEPT 2. | TRANSMIT OFFERED PRODUCT DATA TO REMOT |
| NOTES 2. | |
| CONCEPT 3. | RECEIVE SUBSTITUTE PRODUCT INFO FROM RE |
| NOTES 3. | |
| CONCEPT 4. | POS TERMINAL |
| NOTES 4. | |

*FIG. 6A*

DESIGNATE THE CONCEPTS THAT SHOULD BE ASSOCIATED WITH THIS CLAIM

6411203: CLAIM 1 [H]

A FIRST RF TRANSCEIVER ASSOCIATED WITH SAID CONNECTOR AND CONNECTED TO SAID VEHICLE DATA COMMUNICATIONS PROTOCOL CONVERTING MEANS FOR TRANSMITTING AND RECEIVING THE SECOND RF DATA COMMUNICATIONS PROCOL; AND

COMPONENTS/HARDWARE: ELECTRONIC SUBSYSTEM
COMPONENTS/HARDWARE: ELECTRICAL CONDUCTORS
COMPONENTS/HARDWARE: CONNECTOR IN CAB/TRAILER
COMPONENTS/HARDWARE: CONNECTOR IN SERIES WITH ELECTRICAL
COMPONENTS/HARDWARE: "ANTI-LOCKING BRAKE SYSTEM"
COMPONENTS/HARDWARE: REMOTE DATA TERMINAL
COMPONENTS/HARDWARE: ANY OF SPECIFIC ELECTRONIC SUBSYSTEM
PROTOCOLS: PROTOCOL CONVERSION/PROTOCOL CONVERTER
PROTOCOLS: FIRST PROTOCOL
PROTOCOLS: THIRD PROTOCOL

COMMUNICATIONS: FIRST TRANSCEIVER TO TRANSMIT & RECEIVE DATA
COMPONENTS/HARDWARE: CONNECTOR (NON-SPECIFIC LOCATION)
COMPONENTS/HARDWARE: PROTOCOL CONVERTING "MEANS" (MPF STRUCTURE)
PROTOCOLS: PROTOCOL CONVERTING "MEANS" (MPF STRUCTURE)
PROTOCOLS: SECOND PROTOCOL IS ANY WIRELESS PROTOCOL

SAVE ASSOCIATIONS    CANCEL

*FIG. 6B*

```
PATDEK: VIEW & MANAGE CASE                                    🖶 PRINT VERSION

┌─ WALKERDIGITAL-AUCTION BEHAVIOR: CASE ADMINISTRATION ──────────────────┐
│                                                                         │
│  MAINTENANCE MODE FOR THIS CASE...                                      │
│  MANAGE ACCESS TO THIS CASE                                             │
│  RENAME THIS CASE                                                       │
│  DEFINE BATES NUMBERING                                                 │
│                                                                         │
└─────────────────────────────────────────────────────────────────────────┘

┌─ WALKERDIGITAL-AUCTION BEHAVIOR: PATENTS & CLAIMS ─────────────────────┐
│                                                                         │
│  ADD A PATENT                                                           │
│  7801802   PREVIEW | PROPERTIES | CLAIM CHART | CLAIM REPORT | ADD CLAIM│
│            MANAGE & VIEW PDFS                                           │
│                                                                         │
└─────────────────────────────────────────────────────────────────────────┘

┌─ WALKERDIGITAL-AUCTION BEHAVIOR: GROUP CONCEPTS ───────────────────────┐
│                                                                         │
│  ADD A GROUP                                                            │
│  TO DELETE CONCEPTS AND GROUPS, THE CASE MUST FIRST BE IN MAINTENANCE MODE...│
│  SOFTWARE    EDIT GROUP                                                 │
│      STORE AUTOMATIC PLACE BID RULE                                     │
│      BID RULE ASSOCIATED WITH BIDDER                                    │
│      CONDITION - PLACE BID BASED ON AUCTION TIME LEFT                   │
│      PLACE BID                                                          │
│      CONDITION - DEFINED BY AUCTION INFO                                │
│      INCREASE BID SPEED AFTER BID BY DIFFERENT BIDDER                   │
│      EXECUTABLE INSTRUCTIONS TO DIRECT A PROCESSOR                      │
│                                                                         │
└─────────────────────────────────────────────────────────────────────────┘
```

*FIG. 7*

| | |
|---|---|
| HOMEPAGE | PATDEK: VIEW & MANAGE CASE     🖶 PRINT VERSION |
| CASE ADMINISTRATION | ┌─ LIVE DEMO: CASE ADMINISTRATION ─────────── |
| START A NEW CASE | MAINTENANCE MODE FOR THISE CASE... |
| | MANAGE ACCESS TO THIS CASE |
| ACTIVE CASES | RENAME THIS CASE |
| | BATES NUMBERING: (IGS BATES) IGS 0000000 - 0000000 |
| INACTIVE CASES | |
| | ┌─ LIVE DEMO: PATENTS & CLAIMS ─────────── |
| LOGOUT | ADD A PATENT |
| | 6411203 PREVIEW \| PROPERTIES \| CLAIM CHART \| CLAIM REPORT \| ADD CLAIM \| MANAGE & VIEW PDFS |
| | 6608554 PREVIEW \| PROPERTIES \| CLAIM CHART \| CLAIM REPORT \| ADD CLAIM \| MANAGE & VIEW PDFS |
| | 6744352 PREVIEW \| PROPERTIES \| CLAIM CHART \| CLAIM REPORT \| ADD CLAIM \| MANAGE & VIEW PDFS |
| | 7015800 PREVIEW \| PROPERTIES \| CLAIM CHART \| CLAIM REPORT \| ADD CLAIM \| MANAGE & VIEW PDFS |
| | 7449993 PREVIEW \| PROPERTIES \| CLAIM CHART \| CLAIM REPORT \| ADD CLAIM \| MANAGE & VIEW PDFS |
| | ┌─ LIVE DEMO: GROUP CONCEPTS ─────────── |
| | ADD A GROUP |
| | TO DELETE CONCEPTS AND GROUPS, THE CASE MUST FIRST BE IN MAINTENANCE MODE... |
| | COMPONENTS/HARDWARE     EDIT GROUP |
| |    ELECTRONIC SUBSYSTEM |
| |    ELECTRIAL CONDUCTORS |
| |    CONNECTOR (NON-SPECIFIC LOCATION) |
| |    CONNECTOR IN CAB/TRAILER |
| |    CONNECTOR IN SERIES WITH ELECTRICAL CONDUCTORS |
| |    "ANTI-LOCKING BRAKE SYSTEM" |
| |    REMOTE DATA TERMINAL |
| |    ANY OF SPECIFIC ELECTRONIC SUBSYSTEMS |
| | PROTOCOLS     EDIT GROUP |
| |    PROTOCOL CONVERTING "MEANS" (MPF STRUCTURE) |
| |    PROTOCOL CONVERSION/PROTOCOL CONVERTER |

*FIG. 8*

| REF.NO. 51 | GENERAL | ASSERTED PATENTS ✓ | OTHER |
|---|---|---|---|
| COMMUNICATIONS ✓ | COMPONENTS/HARDWARE ✓ | MISCELLANEOUS VEHICLE STRUCTURES ✓ | PROTOCOLS ✓ |
| DOCUMENTS EDIT? | 5347274_HAZARDOUS_WASTE_TRANSPORT_MANAGE.PDF (PUBLIC) | | |

TO ENTER A CITATION, CHECK THE BOX, ENTER TEXT AND SAVE THE FORM.
TO CLEAR A CITATION, SIMPLY UNCHECK THE CONCEPT AND SAVE THE FORM.

SAVE CONCEPT INFORMATION | CANCEL

CITATION [ HASSETT AT 8:47-49 ]

☑ PROTOCOL CONVERTING "MEANS" (MPF STRUCTURE)
VIEW ASSOCIATED CLAIMS | ADD A QUOTE | UPLOAD IMAGE

"PROCESSING MEANS FOR EFFECTING LAG DATA/MESSAGE CONVERSION FOR MESSAGES RECEIVED OR TRANSMITTED VIA THE TRANSCEIVER"

*FIG. 10*

TYPE OF CHART:

⦿ CLAIM LIMITATIONS SHOWING CORRESPONDING REFERENCES
○ TABLE MAPPING CLAIM LIMITATIONS TO REFERENCES
○ § 102/ § 103 (COMBINATIONS)    ...DISPLAY AS : ⦿ WORD DOC  ○ ON SCREEN

SELECT UP TO 15 CLAIMS:

☐ CLAIM 1
☐ CLAIM 2 (FROM CLAIM 1)
☐ CLAIM 3 (FROM CLAIM 2)
☐ CLAIM 4 (FROM CLAIM 1)
☐ CLAIM 5 (FROM CLAIM 1)
☐ CLAIM 6 (FROM CLAIM 1)
☐ CLAIM 7 (FROM CLAIM 1)
☐ CLAIM 8 (FROM CLAIM 1)
☐ CLAIM 9 (FROM CLAIM 1)
☐ CLAIM 10 (FROM CLAIM 1)
☐ CLAIM 11
☐ CLAIM 12
☐ CLAIM 13

[BUILD CHART]   [CANCEL]

*FIG. 11*

MARK YOUR SELECTIONS, THEN CLICK THE *BUILD CHART* BUTTON LOCATED AT THE BOTTOM.

TYPE OF CHART: ◉ TEXT/CITATIONS ○ CITATIONS ONLY

CHART ORIENTATION: ◉ PORTRAIT ○ LANDSCAPE

SELECT UP TO 40 CLAIMS:
- ☐ CLAIM 1
- ☐ CLAIM 6 (FROM CLAIM 1)
- ☐ CLAIM 7 (FROM CLAIM 6)
- ☐ CLAIM 11
- ☐ CLAIM 12 (FROM CLAIM 11)
- ☐ CLAIM 14 (FROM CLAIM 12)
- ☐ CLAIM 24
- ☐ CALIM 25 (FROM CLAIM 24)
- ☐ CLAIM 29 (FROM CLAIM 24)

SELECT UP TO 40 REFERENCES:
- ☐ BARBIAUX
- ☐ BECKERT
- ☐ BOATWRIGHT
- ☐ BUNN
- ☐ CRANE
- ☐ DEMERY
- ☐ DOYLE '071
- ☐ DRORI
- ☐ FERRONE

*FIG. 12*

A DATA COMMUNICATIONS APPARATUS CONNECTED TO SAID TRACTOR AND SAID TRAILER FOR COMMUNICATING DATA TO AND FROM SAID TRACTOR AND SAID TRAILER, SAID DATA COMMUNICATIONS APPARATUS COMPRISING:

SPEAR

"COMMUNICATION OF INFORMATION INCLUDING DATA BETWEEN A REMOTE COMPUTER AND A VEHICLE IS MANAGED AND FACILITATED USING AN APPARATUS COMPATIBLE WITH STANDARDIZED NETWORK COMMUNICATION LINKS. IN ONE EMBODIMENT, THE STANDARDIZED NETWORK COMMUNICATION LINKS INCLUDE THE INTERNET AND A CONTROLLER AREA NETWORK USED IN VEHICLES. THE APPARATUS PREFERABLY INCLUDES A CONTROLLER CONTAINED IN THE VEHICLE. THE CONTROLLER IS COMPRISED OF A NUMBER OF HARDWARE AND SOFTWARE ELEMENTS INCLUDING A PROCESSOR."
SPEAR AT ABSTRACT

FERRONE

"THE COMMUNICATIONS UNIT, MOUNTED ON THE INTERIOR OF THE VEHICLE, PROVIDES THE CAPABILITY TO CORRESPOND WITH THE SATELLITES SENDING AND RECEIVING MESSAGES. THE DISPLAY UNIT, USED BY THE DRIVER TO SEND AND RECEIVE MESSAGES, IS A FULL KEYBOARD, SIMILAR TO A DESK-TOP PC, ALONG WITH A NUMERIC KEY PAD (SEE APPENDIX 3, FIGURE 2)."
FERRONE AT 2

"THERE ARE THREE PIECES OF EQUIPMENT REQUIRED FOR THIS SYSTEM: THE OUTDOOR ANTENNA, COMMUNICATIONS UNIT AND THE ONBOARD VEHICLE DISPLAY UNIT (SEE APPENDIX 2)."

*FIG. 14*

| | AUTHOR PUBLISHER INVENTOR | TITLE | FILING DATA PUBLISHED/ISSUE DATE | PRIOR ART STATUS | BATES RANGE | HEREIN REFERENCED AS |
|---|---|---|---|---|---|---|
| 1 | | | | | | |
| 2 | HAGENBUCH, LEROY G. | U.S. PATENT NO. 4,839,835 - APPARATUS AND METHOD RESPONSIVE TO THE ON-BOARD MEASURING OF HAULAGE PARAMETERS OF A VEHICLE | APR. 1, 1985 JUN. 13, 1989 | 102(b) | | HAGENBUCH '835 |
| 3 | | | | | | |
| 4 | | | | | | |
| 5 | BARBIAUX, WILLIAM, J. ET AL. | U.S. PATENT NO. 4,804,937 - VEHICLE MONITORING ARRANGEMENT AND SYSTEM | MAY. 26, 1987 FEB. 14, 1989 | 102(b) | | BARBIAUX |
| 6 | | | | | | |
| 7 | DENEKAMP | U.S. PATENT NO. 4,750,197 | JUN. 2, 1987 JUN. 7, 1988 | 102(b) | | DENEKAMP |
| 8 | WINDLE, WILLIAM E., ET AL. | U.S. PATENT NO. 4,926,331 - TRUCK OPERATION MONITORING SYSTEM | FEB. 25, 1986 MAY. 15, 1990 | | | WINDLE |
| 9 | | | | | | |
| 10 | DILULLO | U.S. PATENT NO. 5,025,253 | OCT. 14, 1988 JUN. 18, 1991 | 102(b) | | DILULLO |
| 11 | | | | | | |
| 12 | DRORI, ZEEV, ET AL. | U.S. PATENT NO. 5,081,667 - SYSTEM FOR INTEGRATING A CELLULAR TELEPHONE TELEPHONE WITH A | MAR. 20, 1990 JAN. 14, 1992 | | | DRORI |

*FIG. 15*

```
┌─────────────────────────────────────────────────────┐
│              U.S. PATENT NO. 6,411,203              │
├─────────────────────────────────────────────────────┤
│ CLAIM 1                                             │
│                                                     │
│ § 102                                               │
│ FERRONE                                             │
│ HASSET                                              │
│                                                     │
│ § 103                                               │
│ BARBIAUX - FERRONE                                  │
│ BARBIAUX - HASSETT                                  │
│ BARBIAUX - HINES                                    │
│ BARBIAUX - LESESKY '667                             │
│ BECKERT - FERRONE                                   │
│ BECKERT - HAPKA                                     │
│ BECKERT - HASSETT                                   │
│ BECKERT - HINES                                     │
│ BECKERT - JASPER                                    │
│ BECKERT - KENNEDY                                   │
│ BECKERT - LESESKY '667                              │
│ BECKERT - MOALLEMI                                  │
│ BECKERT - RIGSBY                                    │
│ BECKERT - SCHRICKER                                 │
│ BECKERT - SIMMS                                     │
│ BOATWRIGHT - FERRONE                                │
│ BOATWRIGHT - HAPKA                                  │
│ BOATWRIGHT - HASSETT                                │
│ BOATWRIGHT - HINES                                  │
│ BOATWRIGHT - JASPER                                 │
│ BOATWRIGHT - KENNEDY                                │
│ BOATWRIGHT - LESESKY '667                           │
│ BOATWRIGHT - MOALLEMI                               │
│ BOATWRIGHT - RIGSBY                                 │
│ BOATWRIGHT - SCHRICKER                              │
│ BOATWRIGHT - SIMMS                                  │
│ BOATWRIGHT - WORTHAM                                │
│ BUNN - FERRONE                                      │
└─────────────────────────────────────────────────────┘
```

*FIG. 16*

| PATDEK | | | CLOSE WINDOW | | | |
|---|---|---|---|---|---|---|
| U.S. PAT. 6,452,487 READ PATENT | CLICK ✓ TO LINK TO CORRESPONDING REFERENCE | | | | | |
| | | GOODALL | HAGENBUCH '835 | HANSON | KYRTSOS |
| CLAIM 1 [A] READ LIMITATION | | | | | |
| CARGO LOAD: VEHICLE CARGO | | ✓ | | | |
| VEHICLE: MOTOR VEHICLE | | ✓ | ✓ | ✓ | ✓ |
| VEHICLE: VEHICLE TIP OVER CONDITION | | | | | ✓ |
| CLAIM 1 [B] READ LIMITATION | | | | | |
| CARGO LOAD: LEFT SIDE SENSOR | | ✓ | | | ✓ |
| CARGO LOAD: SENSOR FOR SENSING CARGO LOAD (LEFT SIDE) | | ✓ | | | ✓ |
| CLAIM 1 [C] READ LIMITATION | | | | | |
| CARGO LOAD: RIGHT SIDE SENSOR | | ✓ | | | ✓ |
| CARGO LOAD: SENSOR FOR SENSING CARGO LOAD (RIGHT SIDE) | | ✓ | | | ✓ |
| CLAIM 1 [D] READ LIMITATION | | | | | |
| CALCULATIONS: COMPARE LOAD RATIO RATE OF CHANGE WITH THRESHOLD | | ✓ | ✓ | | ✓ |
| CALCULATIONS: DERIVE LOAD RATIO FROM MULTI-SENSOR DATA | | ✓ | ✓ | | ✓ |
| CALCULATIONS: DERIVE RATE OF CHANGE FOR LOAD RATIO OVER TIME | | | | ✓ | ✓ |
| OTHER SENSORS/COMPONENTS: MICROPROCESSOR CONNECTED TO SENSORS | | ✓ | | ✓ | ✓ |
| CLAIM 1 [E] READ LIMITATION | | | | | |
| OTHER SENSORS/COMPONENTS: ALARM ACTIVE WHEN CONDITION EXCEEDS THRESHOLD | | | | ✓ | |
| OTHER SENSORS/COMPONENTS: ALARM INDICATOR DEVICE | | | | ✓ | |
| OTHER SENSORS/COMPONENTS: MICROPROCESSOR ACTIVATES ALARM | | | | ✓ | |
| OTHER SENSORS/COMPONENTS: MICROPROCESSOR CONNECTED TO SENSORS | | ✓ | | ✓ | ✓ |

FIG. 17

COLLABORATION AND ANALYSIS SYSTEM FOR DISPARATE INFORMATION SOURCES

CROSS-REFERENCE TO RELATED APPLICATIONS

This application claims the benefit under 35 U.S.C. §119(e) of U.S. Provisional Application 61/621,902, filed Apr. 9, 2012, which is hereby incorporated herein by reference.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

REFERENCE TO SEQUENCE LISTING, A TABLE, OR A COMPUTER PROGRAM LISTING COMPACT DISK APPENDIX

Not Applicable.

BACKGROUND OF THE INVENTION

1. Field of the Invention

The invention relates generally to data processing systems. More specifically, the invention relates to a coordinated processing and analyzing of large amounts of data to reveal complex interrelationships in a coherent manner. More specifically still, in one implementation, the invention relates to data processing in accordance with the multifaceted constraints of intellectual property analysis and litigation.

2. Description of the Related Art

In an increasingly complex world, situations regularly arise that require the processing and analysis of large amounts of data, aspects of which might be interrelated in numerous ways. It is often useful to be able to simplify the analysis of data and express interrelationships across subsets thereof in a coherent manner, etc. In the field of complex data processing, various systems are available for distilling large amounts of data down to its core features in a variety of ways for ease of analysis.

One field that regularly involves large data sets with multi-layered complexities is litigation. In the environment of intellectual property, for example, issues of claim construction, infringement, written description, invalidity and/or patentability, among others, might arise. At the heart of these issues are the patent claims, each of which includes a variety of concepts. The issues might require analysis of large volumes of textual and graphical description, followed by the structured analysis and mapping of portions thereof against the claims' individual concepts.

With further respect to intellectual property, in the context of patent analysis or litigation, for example, several variables may contribute to the complexity and volume of data present in a typical case or matter, including large numbers of 1) patents and claims at issue, 2) claim limitations in individual claims, 3) references cited by the applicant and/or patent examiner during examination of an application and/or 4) additional prior art references uncovered during post-issuance investigation. As the data in these categories increase, the number of discrete issues likewise generally increases. To combat this complexity, it may be beneficial to combine related issues into groups for purposes of analysis. When searching for invalidating prior art, for example, systems exist that allow a user to break complex claims down into their individual limitations, and combine multiple similar limitations across claims or patents into conceptual groupings to reduce the number of individual concepts, in an effort to render the search for prior art more efficient.

Despite these features, however, the user may nevertheless be left to sort through hundreds or thousands of prior art disclosures that may apply alone or in combination across large numbers of claim limitation or concepts. It may be beneficial in certain scenarios to further enable a user to rank or otherwise qualify prior art references or individual disclosures in a customizable variety of ways, with respect to the individual claim concepts being investigated.

SUMMARY OF THE INVENTION

One embodiment of the present invention can in one aspect be generally described as an advanced relational database and user interface system used for the evaluation, analysis and generation of specialized reports in any of a plurality of data analysis environments. The database and analysis system can be utilized for many purposes, but may be particularly applicable to the analysis of patent claims and more specifically claim construction, infringement, written description, invalidity and/or patentability. Despite the fact that most of the examples discussed herein focus on patent analysis, those of skill in the art will recognize that the techniques and systems in accordance with the invention are not limited to patent analysis but can be employed in any document or other data-source driven analysis project requiring the collating, comparison and contrasting of multiple information sources. Exemplary environments include crime investigation and case management, medical diagnostics and disease research, and scientific experimentation and exploration, among countless other examples.

The system allows for analysis, querying, report generation, data mining and visualization to be performed or crowd sourced (e.g., taking advantage of the inputs of multiple people) by potentially large numbers of system users, stored over time, edited, manipulated, searched, exported and readily accessed by those having appropriate access rights. Reports, visualization and differing data mining techniques can also be applied by users to manipulate, output and delve into the stored data in a variety of ways.

Different individuals or groups of individuals may be associated with differing levels of access rights, depending on the project. Users are preferably identified by user name and passwords, but additional security features such as IP address checks, security questions and even random verification codes presented to users through smart phone applications can be used to heighten security. In this manner, individuals—even third parties or strangers—can productively contribute to a project with varying access rights. This differentiation between various users facilitates orderly review, management and crowd-sourcing. In the context of patent analysis, third parties might be limited to simply the ability to submit prior art for review. Alternatively, lower level users might be able to enter analysis or perform more manipulation of the information in the system and use varying features of the system. Higher level users might have the ability to create and manage projects, construct, link and delink concepts, etc., and run experiments, generate reports or visualizations of the data, etc.

One important feature of a relational database structure and system according to the present invention is its ability to leverage or exploit informational overlap. In the context of an embodiment of patent analysis, many claims of a patent within a single patent, across a patent family or even across multiple patent families within a similar subject area utilize similar elements, language or ideas. The system of the present invention leverages this informational overlap to facilitate the analysis of potentially vast numbers of patent claims by linking in the relational database the informational overlap—for example overlapping claims, claim elements or limitations or even segments and fragments of claims. This overlapping information is referred to herein as "concepts", "concept phrases", "sub-concepts" or "bridging data." Concepts themselves can be grouped together and organized to facilitate more efficient review of the information sources.

Once this linking of concepts has begun, information sources can be analyzed, entered into the system for comparison, contrasting, analysis and synthesis. The generation of concepts can also be an iterative process where additional concepts are created, sub-concepts are created or concepts themselves can be edited to evolve over time as the collective understanding of the project evolves.

Information sources can be evaluated by the users of the system and information relating to the information source as well as its relation to the concepts can be entered into the system. For example, in the context of patent analysis, an information source might be a plurality of descriptive documents, including prior art references in various forms such as transcripts, figures, brochures, working models and other embodiments. For documents, a user could upload a copy of the prior art reference to the system then enter its relevant bibliographical information (e.g. publication date, author, inventor, etc.) and status (e.g. confidential, public). Another user (or the same user) could then evaluate that item of prior art, matching disclosure from the prior art with the concepts or sub-concepts discussed above. Another user can review that evaluation, make edits, rank or grade the evaluators, etc.

As the evaluation of information sources is in progress, users may track progress of the evaluation of information sources and additionally generate reports and visualizations. Many different types of reports can be generated and many types of data visualization can be implemented.

As one, non-limiting example, a report in the context of a patent analysis project can take the form of invalidity contentions in accordance with the expectations and specific rules promulgated by, for instance, the Eastern District of Texas. As another, non-limiting example, data visualization in the context of patent analysis can take the form of a heat map depicting (using colors ranging from dark purple through white) the intensity or availability or prevalence of prior art disclosures of a certain concept, claim limitation or claim.

Further reporting and analysis or data mining can take the form of experiments. For example, again the context of a patent analysis, different versions of the same type of visualization or report can be run using different fundamental assumptions. For example, the priority date of the patent being analyzed can be artificially set to a particular date—for instance to test the impact of a pre-filing conception date. Alternatively, the experiment could, again in the context of patent analysis, generate reports using only a certain type of information source, in this instance only 102(b) references or only non-confidential references. Alternately, the experiment could test the impact of the removal or exclusion of a particular information source.

Another aspect of the invention is a performance tracking system coupled with an optional incentive or reward system to facilitate and promote the use of the cloud and crowd sourced aspects of the system. Many different levels of access to the system can be established by those who themselves have the highest levels of access. Access to different features of the system can be tailored on an individualized level or based upon certain domain names or based on certain IP addresses, etc. Incentives and reward structures can also be overlaid on these levels of access and likewise tailored in the same fashion. For example, if the system reveals particular prior art shortcomings for one or more concepts in a case, the concept(s) can be identified to third parties for prior art searching to locate the particular concept in a prior art reference whereby a third party is incentivized by money, prizes, fame or other rewards for identifying the missing concept(s) specified as completely lacking, not very well disclosed, or otherwise in need of improvement from the prior art perspective.

Variations of the system include linking cases or projects to expand collections of prior art across different technologies, by linking database elements (concepts, references or disclosures related to concepts for prior art). Other variations include differential access to portions of the system according to user attributes and access controls. User types can include outside counsel, in-house counsel, company representatives, law firm personnel such as assistants, paralegals, non-lawyer technology professions, outside consultants, experts, and third party outsourcing services.

A final aspect of the system is a billing system that charges certain users for access to the system based on a plurality of factors or schedules. For example, the system can bill a user organization on a per user basis or on a tiered user basis—such as an additional fee per every five users. The billing system may also preferably be tied into the performance, reward and incentive system.

This and many other features and advantages of the invention will be made apparent from the following detailed description that proceeds with reference to the accompanying Figures.

A portion of the disclosure of this patent document, in particular the figures, contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BRIEF DESCRIPTION OF THE DRAWINGS

FIG. 2A is a screenshot of a create user screen in accordance with an embodiment of the invention.

FIG. 2B is a screenshot of an initial case setup screen in accordance with an embodiment of the invention.

FIG. 5 is a screenshot of a concept phrase screen in accordance with an embodiment of the invention.

FIGS. 6A and 6B are screenshots of concept phrase association screens in accordance with embodiments of the invention.

FIGS. 7 and 8 are screenshots of case administration screens in accordance with embodiments of the invention.

FIG. 10 is a screenshot of an information source screen in accordance with an embodiment of the invention.

FIGS. 11 and 12 are screenshots of chart generation screens in accordance with embodiments of the invention.

FIGS. 14-16 are screenshots of chart output excerpts in accordance with embodiments of the invention.

FIG. 17 is a screenshot of a data mining output excerpt in accordance with an embodiment of the invention.

DETAILED DESCRIPTION OF THE INVENTION

In the following detailed description of the invention, reference is made to the figures, which illustrate specific, exemplary embodiments of the invention. It should be understood that varied or additional embodiments having different structures or methods of operation might be used without departing from the scope and spirit of the disclosure.

Generally, a system of the present invention can take several forms. First, the system can be deployed to a single computer as a standalone application. More preferably, the system is deployed on a server or series of servers. In a standalone application, the system components would need to include some or all of the system modules as disclosed herein, depending upon a particular implementation.

This disclosure describes embodiments of the invention as systems, non-transitory computer-readable media (e.g., embodied in a hard or floppy disk or other computer storage medium), and methods of using analysis platforms to analyze information within controlled environments that include on-line and off-line components. Throughout this disclosure, controlled environments include environments that are accessible to users and that allow users to analyze and control information within a segregated environment. The analysis platforms allow users to analyze information directly, indirectly and interactively. In one example, the method includes accessing the analysis platforms using an administration application that allows users to generate and modify analysis segments for a defined amount of time within the controlled environments. The administration application controls a portion of the controlled environments for access by other users. The administration application further links analysis segments to patent claims. The administration application enables users to configure the controlled environments for a defined amount of time within the controlled environments. As a result, the analysis platform supports a plurality of distinct controlled environments that may be linked for further integrated analysis.

The administration application allows users to perform functions, such as create other user profiles; select patents; select an analysis time period; generate messages; select a communications preference; select display and modification parameters; and establish analysis segments; among other functions.

Figure 1A:
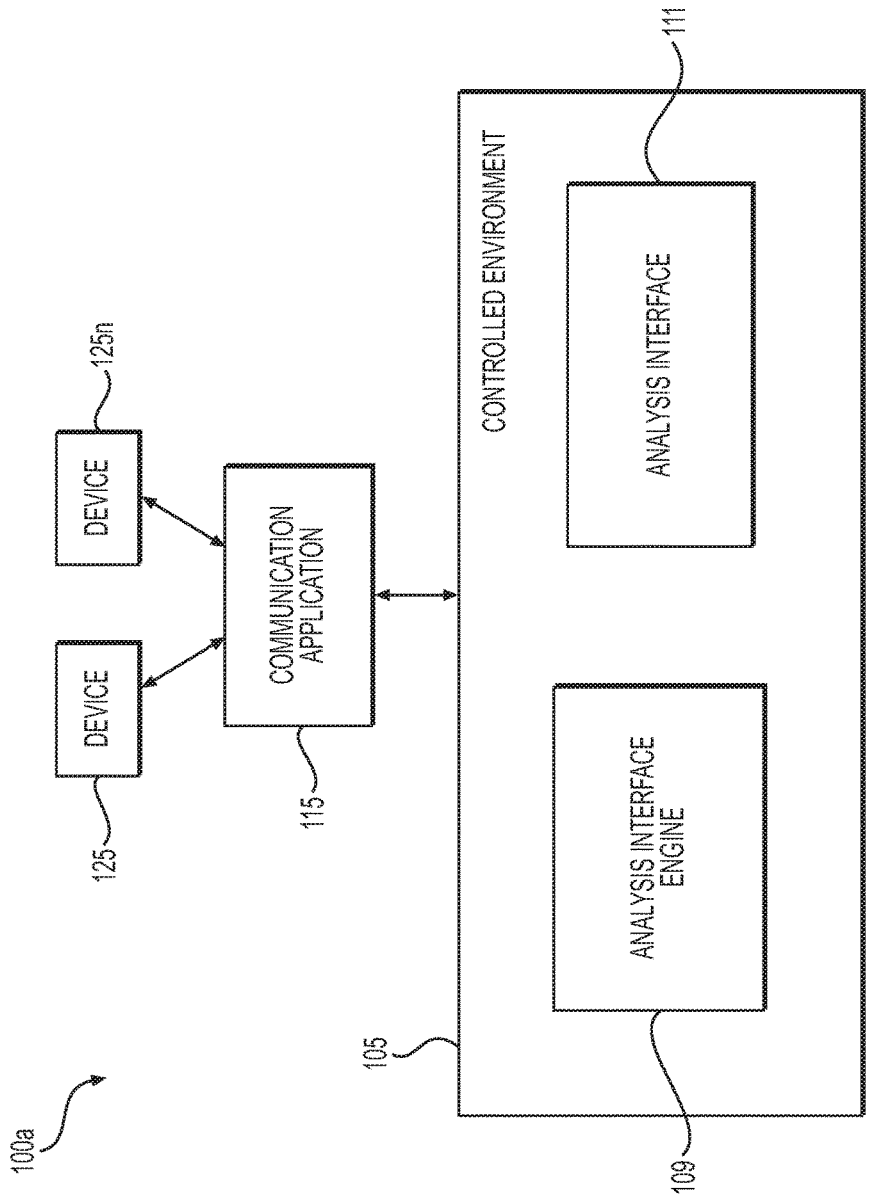
FIG. 1A is a high-level system architecture diagram in accordance with an embodiment of the invention.

A generalized embodiment of an overall system configuration is illustrated as a system 100a in FIG. 1A. The embodiment of an exemplary analysis platform 100a in accordance with the invention includes a controlled environment 105, a communication application 115, and one or more user devices 125 to 125n (where n is any number of devices). According to one example, the controlled environment 105 provides users of the analysis platform 100a with a secure gateway for navigating various on-line resources. The controlled environment 105 may include a plurality of components for communicatively coupling with other data repositories or with the one or more user devices 125 to 125n. For example, the controlled environment 105 may include an analysis interface engine 109 and analysis interface 111, among other components.

The user devices may include or access a communication application 115 for accessing resources through the controlled environment 105. The communication application 115 may provide a consistent graphical user interface ("GUI") for navigating various resources, including the analysis interface engine 109, and analysis interface 111, among other resources. The analysis interface 111 receives and provides information from communication application 115 to analyze and manipulate information contained within controlled environment 105.

The communication application 115 allows users to directly access the controlled environment 105 via a private or public dedicated URL, or dedicated connection method including a virtual private network ("VPN"). Once within the controlled environment 105, the analysis interface engine 109 may allow users to search information and generate reports for the information, including claim charts and contentions, with the controlled environment 105.

As described in further detail below, if the user is registered with an access server that is associated with the controlled environment 105, the user may be authenticated by matching authentication information with access information that preexists on the access server. Alternatively, if the user is not authenticated by the access server, then the user may be invited to submit requested authentication information or take other action.

If the user is authenticated, then the user may be directed to the analysis interface engine 109, which enables the user to access case specific information. The analysis interface engine 109 presents users with information and templates that may be customized, while providing users with a functionality and uniformity within the controlled environment 105. In other words, the functionality of the analysis interface engine 109 remains familiar to users within the controlled environment 105.

The invention might be implemented in a variety of ways. In one embodiment, the system code is written using Adobe System's ColdFusion Markup Language (CFML) version 8, HyperText Markup Language (HTML), JavaScript and Microsoft's Structured Query Language (SQL). The application may be developed on a Windows XP platform but can also run on Windows 7, among others. The system uses both the Windows Internet Information Services (IIS) and ColdFusion Server services to process the code and data into web pages. In one implementation, all data records are stored in a Microsoft SQL Server 2005 database using a relational database schema.

The code may be organized using the Fusebox methodology. Fusebox is a framework for building web applications comprised of circuits that correspond to directory and file structures on the web server that function as event handlers to serve up code templates as necessary. One skilled in the art would appreciate that many variations are possible without departing from the scope of the invention as described herein.

Figure 1B:
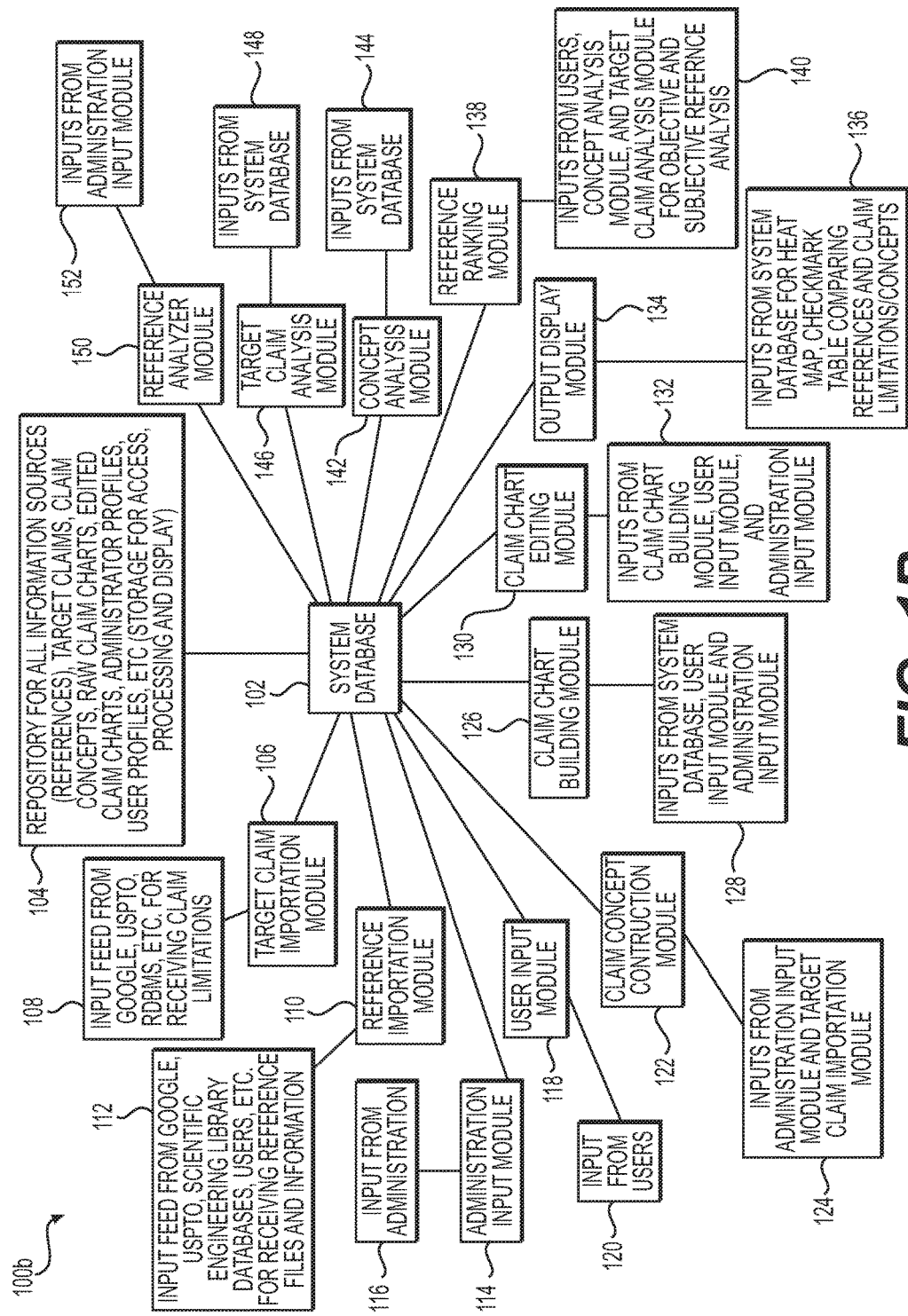
FIG. 1B is a system architecture diagram in accordance with an embodiment of the invention.

An embodiment of the overall system configuration is illustrated as a system 100*b* in FIG. 1B and described more generally herein. Each module communicates directly or indirectly with the System Database 102 to receive and send information for a module's functionality, and further may receive information from other modules directly, or indirectly through the System Database 102.

The System Database 102 is a relational database serving as or coupled to a repository 104 for all Information Sources, generally referenced herein by the terms prior art, prior art references, prior art documents, system descriptions, product descriptions, or other documents and descriptions that are to be analyzed by the system 100*b* with respect to the Target Claims. The System Database 102 further includes various information via the repository 104, including Target Claims, Claim Concepts, Raw Claim Charts, Edited Claim Charts, Administrator Profiles, User Profiles, etc., representing stored data associated with the aforementioned, such as for accessing, processing and displaying of a variety of information by the system 100. Additional analysis may be stored by the System Database 102 including Target Claim Analysis, Concept Analysis and Reference Ranking analysis as described further below.

The Target Claim Importation Module 106 receives and processes information related to one or more claims of one or more target patents. The claim information may be retrieved as input 108 from feeds from Google Patents, the USPTO, RDBMS (Relational Database Management System) or other sources having claim limitations for target patents. The Target Claims may be segmented according to the familiar claim limitation breakdown by semicolon or otherwise, and further configured via user input to make corrections or changes as suitable to reflect the claims as issued, reissued or otherwise recognized as amended by the USPTO.

The Reference Importation Module 110 receives and processes information related to one or more Information Sources, such as prior art references or product/service descriptions. The Information Sources may be retrieved as input 112 from feeds from Google Patents, the USPTO, Scientific Engineering Library Databases, Users, etc. for receiving reference files and reference information. PDF or other electronic references may also be received by the Reference Importation Module.

The Administration Input Module 114 receives inputs 116 from a case administrator for manipulation of case information, including template fields, claim associations, claim concepts, Target Patents for the Target Claim Importation Module, etc.

The User Input Module 118 receives inputs 120 from users of the system 100*b* for manipulation of case information including disclosures of the Information Sources matching claim concepts, motivation to combine information, and other information related to the Information Sources. The User Input Module 118 also receives inputs related to information to be displayed or output from the System Database 102 including various forms of claim charts, claim reports or other views/reports of information contained within the System Database 102.

The Claim Concept Construction Module 122 receives inputs 124 from Administration Input Module 114 and Target Claim Importation Module 106. In exemplary embodiments, the Claim Concept Construction Module 122 is configured to parse Target Claim information into features representative of portions of a claim limitation. The features are also referred to herein as concepts, claim concepts, segments, or claim segments. Because claims oftentimes repeat specific claim language or use different claim language to represent an aspect of a claimed invention, there is repetition of claim limitations or minor variances with respect to claim limitations across multiple claims of a patent, or claims in different patents from the same family. Concepts are used to represent the same or similar features recited in Target Claims that are repeated within a single claim or among other claims.

The Claim Concept Construction Module 122 presents to a User, typically a User with Administrator privileges, all claims from a Target Patent. From the claims of a Target Patent, the User may extract concepts such that the concepts are representative of all claim limitations for each claim of a Target Patent. In one exemplary embodiment, the Claim Concept Construction Module 122 presents a list of claims and permits the user to drag and drop concepts into a Concept Extraction area for grouping similar recited claim language for tagging or association with one concept. In this way, various recitations of claim language are associated with the same concept. In addition, the System Database 102 associates each concept with the corresponding claim limitation indicated by the user. In another embodiment, the concepts for Target Claims may be listed manually by a user in the form of a chart, whereby the claim language appears in a left hand column and the one or more concepts for each claim limitation appear in the corresponding row for the claim limitation. The user will mentally extract one or more concepts that represent each claim limitation for each Target Claim and write, type or otherwise record the information in a claim chart. Once all concepts are identified and recorded manually in a chart for the Target Claims, the User will associate, tag or otherwise link each concept using an interface of the Claim Concept Construction Module 122, thereby instructing the System Database 102 as to the relationship between each concept and one or more claim limitations (as described further below with respect to other figures). In yet another embodiment, the Claim Concept Construction Module 122 may be configured to receive an identification of concepts for each limitation of each Target Claim by presenting the user with a first claim limitation. The user will then input a first concept for that claim limitation. The concept will be added to a list displayed to the user. The user will then input a second concept for the claim limitation, with the second concept added to the list of concepts for the claim limitation, and so on, until the claim limitation has the appropriate concepts associated to it. For the next claim limitation, the user may input a concept for the claim limitation or choose an appropriate concept from the list of concepts previously associated with a different claim limitation. In this way, concepts are reused or may be added to the case. This workflow is continued until all Target Claims have appropriate concept associations.

In a further configuration for each of the above embodiments for the Claim Concept Construction Module 122, the module may additionally allow the user to pre-select claims and/or claim limitations that are similar from a list of all claims. In this manner, after concept associations are indicated by a user for a claim limitation, the Claim Concept Construction Module 122 will associate the same list of concepts for the pre-selected claims or claim limitations that are identified by the user as being the same or similar to the just analyzed claim limitation, further advancing the workflow and avoiding repetition of having to make similar associations, and also avoiding mistakes in not making the same associations for a limitation that were intended by the user, but overlooked. By populating the same or similar claim limitations in this way, the user still has the ability to alter or change pre-populated concepts at any time.

The Claim Chart Building Module 126 receives inputs 128 from the System Database 102, User Input Module 118 and Administration Input Module 114. In an exemplary embodiment, the Claim Chart Building Module 126 is configured to generate claim charts in various forms by allowing the user to specify one or more Target Claims and one or more Information Sources (references) that are to be contained within a claim chart. Single or multiple claim charts can be specified by a User and delivered to a user's access device, or otherwise stored in the System Database 102, in various formats including Microsoft Word, PDF, Microsoft Excel, XML or other electronic document formats. The Windows COM standard is used to put information for the System Database 102 into various Microsoft Word-based claim charts and other Microsoft Word based reports.

The Claim Chart Editing Module 130 receives inputs 132 from Claim Chart Building Module 126, User Input Module 118 and Administration Input Module 114. In an exemplary embodiment, the Claim Chart Editing Module 130 is configured to edit or otherwise revise claim charts in various forms by allowing the user to specify changes to claim charts generated by the Claim Chart Building Module 130. Single or multiple claim charts can be specified for changes or edits, indicated by a User, and then delivered to a user's access device, or otherwise stored in the System Database 102, in various formats including Microsoft Word, PDF, Microsoft Excel, XML or other electronic document formats.

The Output Display Module 134 receives inputs 136 from the System Database 102. In an exemplary embodiment, the Output Display Module 134 is configured to output or otherwise display all information stored in the System Database 102 in various configurations that show individual data elements and/or relationships between the data elements including concepts, claim limitations, claims, Target Claims, Target Patents, User access privileges, data accessed or input by a User, Information Source data elements including associated meta data such as dates, subjective rankings, User comments, claim charts, other reports, etc.

The Reference Ranking Module 138 receives inputs 140 from Users, Concept Analysis Module 142, and Target Claim Analysis Module 106 for objective and/or subjective reference analysis. In various methodologies and algorithms described further herein, the Reference Ranking Module 138 associates various criteria for determining how a reference compares to other references in an objective fashion (number of concepts disclosed, particular concepts disclosed as compared with how many other references disclose the same concept, how many claims/claim limitations require a particular concept, etc.) and also in a subjective fashion (how users rank the reference overall, how the user ranks particular relevance or importance of a reference's disclosure of a concept, etc.). The Reference Ranking Module 138, in combination with other modules, is used to generate and further identify specific results tailored to identifying the most important references to claims, claim limitations or concepts as requested by a User or other portions of the system 100, including other modules.

The Concept Analysis Module 142 receives inputs 144 from the System Database 102 for objective and subjective analysis of concepts. In various methodologies and algorithms described further herein, the Concept Analysis Module 142 associates various criteria for determining how a concept compares to other concepts in an objective fashion (number of times a concept is disclosed by the references as a whole, frequency of a concept disclosed by each reference, number of times a concept is associated with a claim and/or claim limitation and/or Target Patent, etc.) and also in a subjective fashion (how users rank the concept's disclosure by a reference overall, how the user ranks the particular relevance or importance of a reference's disclosure of a concept, etc.). The Concept Analysis Module 142, in combination with other modules such as the Reference Ranking Module 138 and the Target Claim Analysis Module 146, is used to generate and further identify specific results tailored to identifying the most important concepts for claims, claim limitations or references as requested by a User or other portions of the system 100, including other modules.

The Target Claim Analysis Module 146 receives inputs 148 from the System Database 102 for objective and subjective analysis of concepts. In various methodologies and algorithms described further herein, the Target Claim Analysis Module 146 associates various criteria for determining how a Target Claim compares to other Target Claims in an objective fashion (number of different concepts required by a Target Claim, frequency of a concept as associated to claim limitations of a Target Claim, frequency of similar claim limitations identified by a user as compared to other Target Claims, frequency that words of a concept are recited in a Target Claim, etc.) and also in a subjective fashion (how users rank the importance of a Target Claim as compared to other Target Claims, how the user ranks the particular relevance or importance of a claim limitation of the Target Claim to the importance of claim limitations of the Target Claim or the claim limitations of other Target Claims, the frequency in which a single reference or multiple reference combination discloses an entire claim limitation of the Target Claim based on the user's ranking of a concept's strength of disclosure for each concept associated with the claim limitation, the frequency in which a single reference or multiple reference combination discloses the entire Target Claim based on the user's ranking of a concept's strength of disclosure for each concept associated with the Target Claim, etc.). The Target Claim Analysis Module 146, in combination with other modules such as the Reference Ranking Module 138 and the Concept Analysis Module 142, is used to generate and further identify specific results tailored to identifying the most important concepts for claims, claim limitations or references as requested by a User or other portions of the system 100, including other modules.

The Reference Analyzer Module 150 receives inputs 152 from the System Database 102 for objective and subjective analysis of concepts. In various methodologies and algorithms described further herein, the Reference Analyzer Module 150 associates various criteria for determining how a reference or information source compares to other references or information sources in an objective fashion (number of different concepts disclosed by a reference, frequency of a concept disclosed by the reference, frequency that a word of a concept or a phrase of the concept matches words of the reference, etc.) and also in a subjective fashion (how users rank the importance of a reference as compared to other references, how the user ranks the particular relevance or importance of a references disclosure as a primary reference candidate compared with other references, how user's specify the importance of a reference's priority date with respect to one or more Target Claims based on the priority date of each Target Claim, the frequency in which a single reference or multiple reference combination discloses an entire claim limitation of the Target Claim based on the user's ranking of a concept's strength of disclosure for each concept associated with the claim limitation, the frequency in which a single reference or multiple reference combination discloses the entire Target Claim based on the user's ranking of a concept's strength of disclosure for each concept associated with the Target Claim, etc.). The Reference Analyzer Module 150, in combination with other modules such as the Reference Ranking Module 138, the Target Claim Analysis Module 146 and the Concept Analysis Module 142, is used to generate and further identify specific results tailored to identifying the most important concepts for claims, claim limitations or references as requested by a User or other portions of the system 100, including other modules.

When deployed as a cloud-based system on a server or system of servers, individual users can preferably access the system 100b using any one of several available commercial browsers such as Firefox, Internet Explorer, Chrome, and Safari. Depending on the suite of features deployed by a particular installation of the system, using commercially available browsers might require the users to install and occasionally update browser plug-ins. Alternatively, the users can download and install a standalone thin-client. Users accessing the system 100b through one of the preferred commercial browsers are presented an intuitive graphical user interface having features familiar to most users—menus, radio-buttons, tabs, folders, links, etc.

In relation to the generalized embodiment of an overall system configuration of system 100a in FIG. 1A, the modules, information and functionality of FIG. 1B and their respective descriptions may be further understood with the high level blocks of FIG. 1A. For example, the controlled environment 105 may include system database 102 (including information of repository 104), target claim importation module 106, reference importation module 110, administration input module 114, user input module 118, claim construction module 122, claim chart building module 126, claim chart editing module 130, output display module 134, reference ranking module 138, concept analysis module 142, target claim analysis module 146, reference analyzer module 150. The analysis interface engine 109 of controlled environment 105 may include claim construction module 122, claim chart building module 126, claim chart editing module 130, output display module 134, reference ranking module 138, concept analysis module 142, target claim analysis module 146, reference analyzer module 150. The analysis interface 111 of controlled environment 105 correlates data of the system 100b, inputs from the user, and various displays of data in cooperation with analysis interface engine 109. For example, analysis interface 111 may generally represent input feed 108, input feed 112, input from administration 116, input from users 120, and the various inputs 124, 128, 132, 136, 140, 144, 148 and 152.

Initially, the users of a system in accordance with the invention, which in this embodiment and throughout the disclosure herein may be a system as exemplified by systems 100a and/or 100b, as reflected in FIGS. 1A and 1B, respectively, or may vary significantly therefrom as described herein, may establish a project, so as to segregate a current instance of analysis and evaluation from past or future instances. Any user with appropriate access rights, for example a "Case Administrator," can establish a project. In the context of one embodiment, a patent analysis project, the project can be referred to as a "case," which may or may not uniquely correspond to, for example, a pending litigation.

The establishment of a case may create a link on a navigation screen and may also automatically populate the case with certain menus, links, etc., to assist the users' further preparation of the case for analysis. Other levels of access rights may be provided with other levels of permission and accordingly other abilities to manipulate the system to access certain features and the data that resides therein.

Referring now to FIG. 2A, the system allows users having sufficient access rights to also create new users associated with or within a particular case or project. Users are preferably recorded and recognized using their first names, last names, email address and passwords. Preferably, the user logs into the system by way of his or her user name and password. Preferably, a user with sufficiently high access can manage and establish other users with equal or lower levels of access. To ensure security users might also be subject to IP address checks, security questions if an unrecognized device or IP address is being used to access the system or even asked to submit randomly generated verification codes, unique to each user, that are obtained by way of a smart phone application or text messaging system.

Many different levels of access can be created, each having its own associated rights to use the system and its features, as explained herein in more detail. Once a user is created, the user name is populated. From there, certain users can be added or removed from the case. In this particular example, the only users associated with the "Walker Digital" case are Jay Guiliano and Frank Rathgeber. Both individuals have "gate keeper" access rights. The labels on each level of access, such as "gate keeper" are arbitrary and customizable as are the access rights and features permitted to be used or even viewed.

Preferably, "gate keeper" level of access allows the establishment and management of lower level user rights, but does not permit access to searching, analysis or data entry, for example. This screen also preferably displays the number of users, their access levels, their status and further provides for the ability to delete users. Maintenance of users and access rights is preferably flexible so that the users of the system can provide each level of user with a customized bundle of access rights.

Other specific system user levels can be created as needed. For example, in a large crowd-sourcing project, it might be desirable to have one individual monitor and manage the performance of a plurality of third party system users. Potentially, such a manager might be able to access menus and system features relating to monitoring performance and activity of the third party system users, but not be able themselves to enter or manipulate data relating to the projects.

As yet another example, certain users might be granted the ability only to upload new potential sources of information. Other user access levels might be permitted to upload new information sources and evaluate those information sources, or alternatively upload new information sources but only evaluate the sources others have uploaded, as a quality control mechanism. Higher levels of access could potentially add or delete information sources, run certain types of reports, etc. Higher levels still might be able to access deeper levels of the relational database to expand, contract, edit, link or delink the concepts discussed herein.

FIG. 2B depicts a case administration screen of an embodiment of the present invention. From this screen, the users of the system can start a new case, review active cases or review inactive cases by clicking the appropriate link. Within an active case, for example the "Walker Digital" case depicted in FIGS. 2A and 2B, the user has several options.

First, the users can enter a maintenance mode for the case. The maintenance mode locks down the information contained in the database so that fundamental aspects of the database can be edited or the case can be placed on inactive status. The user may also set up new users or edit or modify current user access rights. The case title itself may be edited. Additionally, the case administration screen allows the user to set up bates numbering conventions that will be used by information source documents by the various parties to a patent litigation, if the project is associated with a patent litigation.

In the area depicted below in FIG. 2B, the user may also add, edit, manipulate or modify the database with respect to individual target documents, in this case a patent document. By clicking on the appropriate link, users with sufficient access can add new patents. Alternatively, for an existing target document, in this case the '942 patent, users with sufficient access rights can preview the patent, edit the properties associated with this patent in the database, create or edit or modify claim charts, run reports, such as a claim report, add or edit claims of interest and manage and view associated documents, such as .pdfs associated with the target document.

If another project has already analyzed a particular patent, and the users associated with this project have access to the associated database information, the system can optionally import or copy information from that previous project. In a similar fashion, the system can create backups of projects and all of the associated data on a predefined schedule or on a variable schedule depending on the frequency of use—for example, while users are entering data backups that occur more frequently than when users are only logging on sporadically.

Preferably, projects are protected from one another and from outside unauthorized access by way of the username/password/security system described above, but also through the encryption of a projects specific data. Indeed, because of the often confidential legal nature of the analysis involved in the a patent analysis embodiment, the administrators of the system might not be able to either view data or decrypt data without particular access codes and authorizations from case administrators.

If a user lacks sufficient access rights, the system may not even grant them the ability to view this screen or alternatively may not present or allow certain links to progress. Depending on user access levels, certain actions may or may not be permitted by certain users—for example, a user might be able to create or view claim charts, but not be able to add new patents or vice versa.

Figure 3:
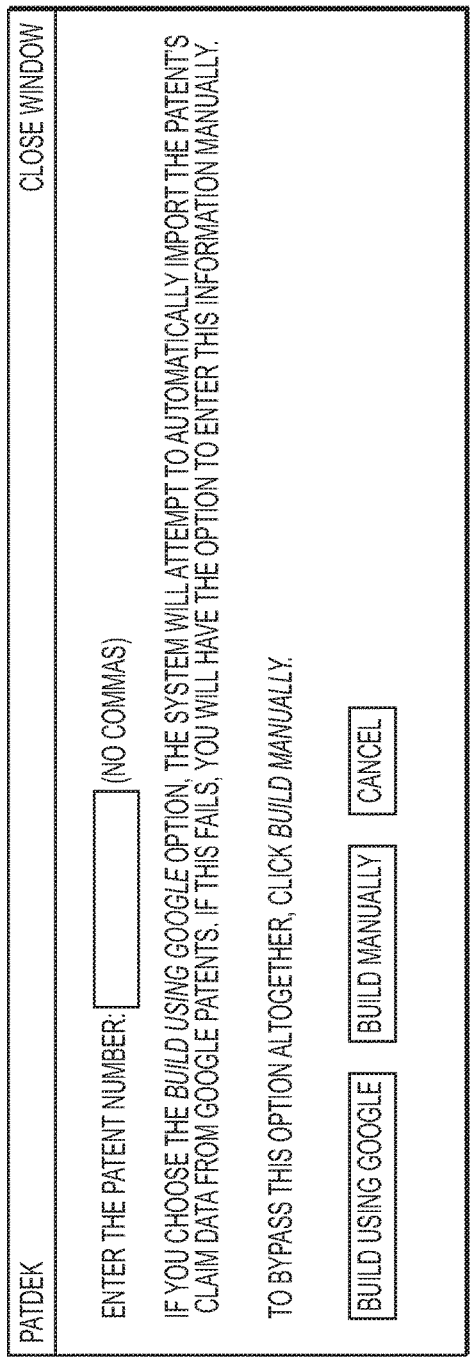
FIG. 3 is a screenshot of an automatic import and parsing screen in accordance with an embodiment of the invention.

Referring now to FIG. 3, if a user with sufficient access in the case administration screen has the ability to add a new target patent, the system will redirect or present the screen depicted in FIG. 3 as a pop-up or as a new window in the browser or interface. This screen allows users to automatically import information from a new patent from an open-source tools, such as Google patents or the USPTO website (not shown) or some other source (whether open or not). If an automatic import is unavailable or undesirable, the information can be built up within the database manually.

Figure 4:
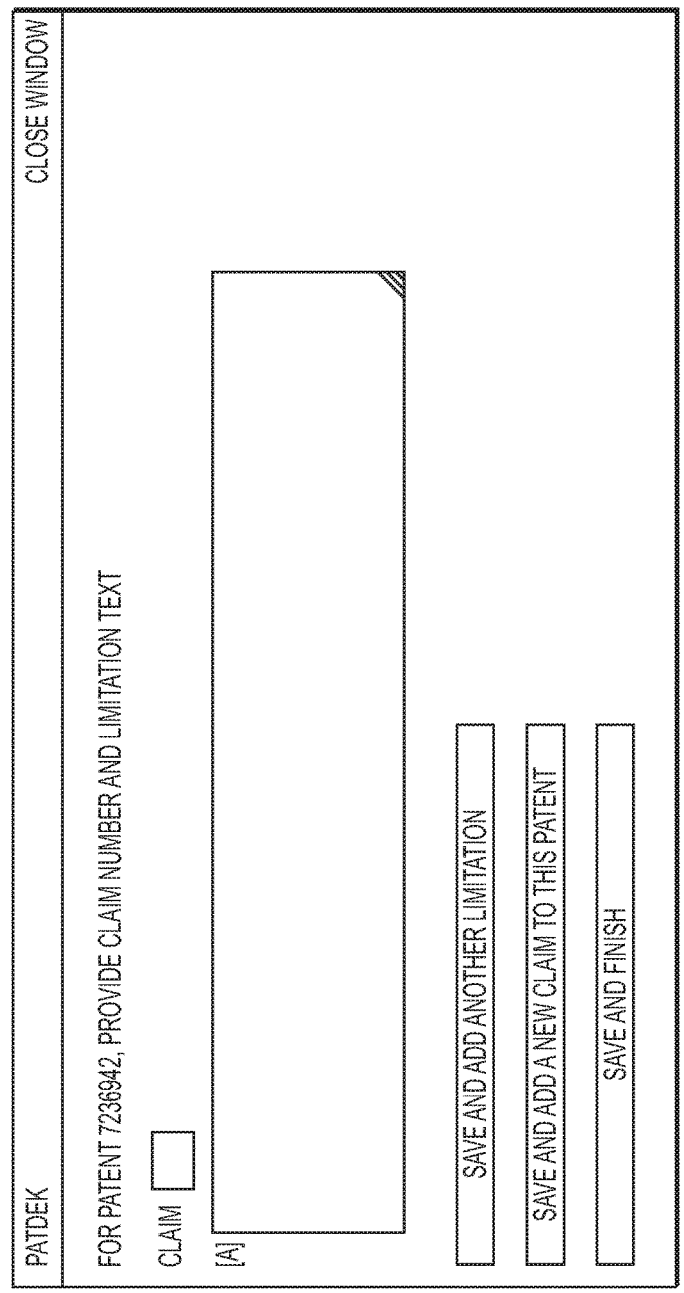
FIG. 4 is a screenshot of a manual patent entry screen in accordance with an embodiment of the invention.

If manual building of target information—in this case the claims of a patent—is selected, the system presents the screen of FIG. 4 to a user of sufficient access. Here, the user is presented with simple text boxes to delineate the various limitations of a specific claim. As a default, but changeable convention, the system recognizes separate claim limitations as a whole number followed by a letter as X[a], X[b], X[c], as a whole number as claim Y, etc., according to the specific structure of the claims. After each respective claim limitation is manually entered into the system, the user may alternatively save and add another limitation, save and add a new claim to the patent or save and finish or exit.

Once claim limitation information is entered, users with sufficient access to the system may create prima facie links and hierarchies in the target information. In the example of a patent analysis project, this is done by setting up the dependency structure between various claims in a target patent. If the automatic importation of claim limitations is selected, this process also occurs manually with the ability of the user to review and edit this dependency structure, should an error be introduced. For example, if a claim depends from a claim that depends from another claim, the system will establish that hierarchy. The system is capable of recognizing multiple dependencies or alternative dependencies as well—for example, claims written as "claim Z depends from either claim X or claim Y wherein . . . " using any number of techniques to distinguish between the claims, denoted claim Z(Y) and claim Z(X).

Either prior to or subsequent to the establishment of the target information, e.g. patent claims, in the system, important bibliographic information regarding the target information or patent can be established in the system. In the example of a patent analysis project, this information can take the form of the names of the inventor or inventors, the patent number, application information, an issue date and the filing date or dates of priority applications.

Additionally, if necessary or desirable, priority dates can be established within the system for individual claims or claim limitations at the outset of a project or later when such information becomes known with greater confidence. The target information may also be labeled with a nickname to make it easier for users to navigate through more complex projects. In the example shown in FIG. 2, the target patent is given the nickname of "pre-sale." This may be of particular use when, in the case of target patents the last three numbers of the patent number are the same.

It should also be noted that both target information and information sources—the target patent and prior references in a patent analysis embodiment—can be tracked using bates numbers or other serial numbers and copies of these documents can be uploaded and linked to the project appropriately.

Next, with reference to FIG. 5, the target information can be analyzed to create and leverage informational overlap. In the example of one embodiment—a patent analysis project—the patent claims can be broken into what are referred to herein as "concepts" or "concept phrases." Concept phrases generally represent shorthand, abbreviated or mnemonic descriptions of the target information's overlapping constituent components. In one embodiment, this represents the overlap between patent claims, claim limitations or even fragments of claim limitations.

These overlapping concept phrases are linked or associated with portions of the target information, in the case of a patent analysis embodiment, to portions of claim language. The structure, associations, grouping and labeling of the concepts is controlled by users with sufficient access and can be edited and evolved as the project evolves.

Concepts may be set, depending on the preferences of the user to a very granular or specific lever or at a higher level. This often depends on the identification of potentially important items of information beforehand. In any event, as stated elsewhere, the concepts may be adjusted and readjusted as necessary.

Using the example of patent analysis, if for example a small number of claims and claim limitations are to be evaluated, tying concept phrases to more granular information can be advantageous. On the other hand, if a large number of claims and claim limitations are to be evaluated, tying concept phrases to less granular information can be advantageous. Typically, the system users will use a mixed approach as appropriate. As a result of breaking claims into concept phrases, each portion or limitation of a claim will be associated with one or more concept phrases and each claim to be evaluated or analyzed may be expressed as various combinations and permutations of the concept phrases. Importantly, these concept phrases can be established across multiple patents, whether such patents are related in a patent filing sense or whether such patents simply share certain features.

Here, the claim limitation is perhaps too complex to be simply linked with a single concept. Instead, multiple concepts will be associated with this claim limitation. The available concept phrases are presented in the box on the left and using the arrow keys, the user can associate these concepts with this specific claim limitation. The order of the concepts within the claim limitation association can similarly be ranked to later ensure readability of the outputted reports. Once the user is satisfied that the associations are correct, the user clicks the save associations button and proceeds to the next limitation. Alternatively, if the user determines that a new concept is necessary, the user can hit cancel and navigate back to the concept creation screens.

Referring back to FIG. 5, depicted is an exemplary breakdown of a single claim of the target patent into various concept phrases. A user with sufficient access may read a limitation in its entirety by clicking on the corresponding link. This is often useful during the process of creating the concept phrasing or during the editing of concept phrases. By clicking on the "manage associations" link, a user with sufficient access might be able to adjust what concepts are associated with a particular limitation. In this exemplary breakdown of the '942 patent, claim limitation 1[a] is associated with the concept of "Selling Activity: [preamble] software to sell substitute product." Claim limitation 1[b] is associated with two concepts—a "POS terminal" and "receiving transaction data regarding the offered product."

With reference to FIG. 6A, once the concept phrases is established, the user can associate concept phrases with each other based on similar characteristics. While this organizational step is not strictly necessary, it is preferable in order to present a cleaner graphical user interface for the system users and to speed the later review of information sources—in this case prior art references and documents. More preferably, these associated concept phrases are organized and presented as separate tabs in the web-based interface, similar to most web browsers and accordingly intuitive to most users.

Establishing concept phrases, linking the concepts with claims and associating the concepts with each other can be an iterative process until the system users are satisfied with the coverage of the claims and the varying levels of granularity desired. The concept phrases and associations can then be "locked down" by the system or by certain users granted certain access privileges, such as a case administrator or manager. Likewise, if adjustments or edits prove necessary, the case administrator can then unlock the concept phrases and their respective associations.

With reference to FIG. 6B, a user with sufficient system access has clicked on the manage associations link of a screen, similar to FIG. 5 corresponding to limitation 1[h] of the target claim. When the system presents such a screen to a user with sufficient access the user is able to examine a list of all of the concepts that have so far been established for the project. By clicking the appropriate concept and the left and right arrows, the user is able to associate one or more concepts with the limitation presented above, in this case 1[h]. In a similar fashion, the user may remove a concept from its association with that same limitation. This is often useful when concepts have been edited or manipulated to be more granular or less granular, given the circumstances or when an assumption of the project that resulted in the establishment of the original set of concepts. For example, in the particular example depicted in FIG. 6B, users of the system may decide the "RF" should be divided into sub-concepts, such as wi-fi and cellular to account for a situation where a court might later adopt a claim construction that included or excluded one or the other from the meaning of "RF." Once the user is satisfied with the concept associations for a given limitation, the user may click the "save associations" button. Alternatively, the user may click on the "cancel" button to return to the previously saved state. In one embodiment of the present invention, a patent analysis project, the system also preferably reminds the user that certain limitations are written in means-plus-function format. The user is then reminded or prompted to later input into the system an identification of any structure that performs the designated structure. Optionally, when a means-plus-function limitation is established, the system of the present invention may create a specific data entry field for the corresponding structure.

FIG. 7 illustrates another aspect of the system according to the present invention. Here a user is presented with an updated case administration screen, similar to the case administration screen described above. Importantly, here the concepts associated with this patent have been established (at least in part) and the hierarchy or grouping of concepts has also been established (at least in part). Specifically, the user is presented with a grouped list of concept phrases under the heading "Software." Users with sufficient access can enter into "maintenance mode" in order to create, delete, edits and rearrange concepts and groups of concepts.

FIG. 8 illustrates a further aspect of the system according to the present invention. Now the user has been presented with an even further developed case administration screen. Several patents have been added to the project and a more developed list of concepts, grouped under various headings has been established. The two concept groups depicted in FIG. 8 are the "Components Hardware" group and the "Protocols" group. Note that a user with sufficient access is granted the ability to add a new group, or edit existing groups by clicking on the appropriate corresponding link.

Figure 9:
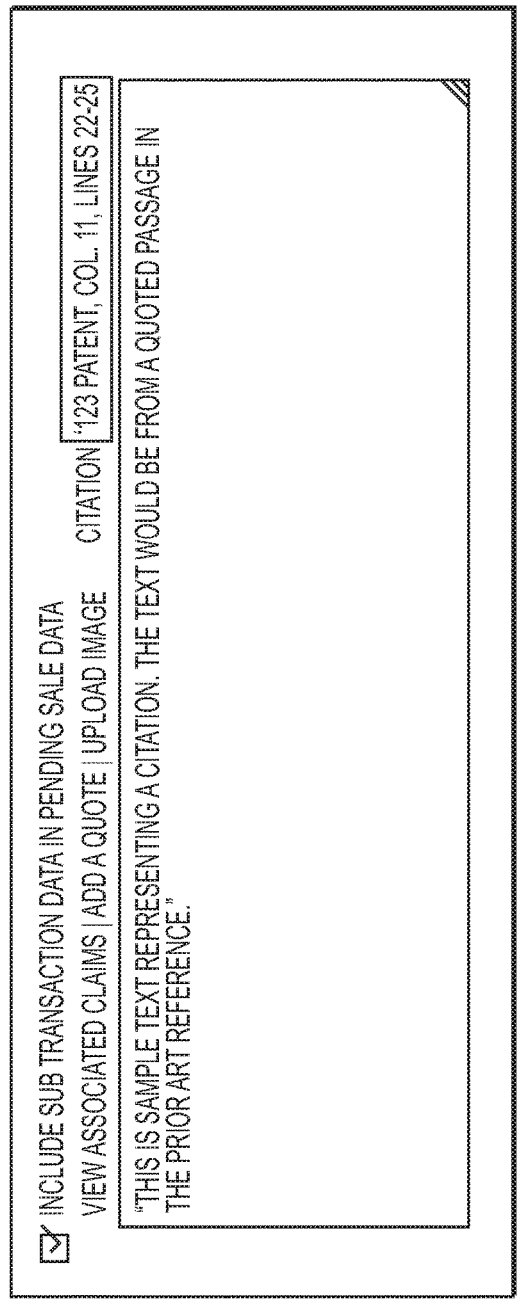
FIG. 9 is a screenshot of a citation format screen in accordance with an embodiment of the invention.

It is preferable in many instances to ensure a consistent presentation and collection of data within the system. This can be particularly important in crowd-sourcing projects where many different users might have very different preferences for analyzing and inputting information from information sources, or in the case of the a patent analysis embodiment inputting information from prior art references. This system attempts to regiment data input by allowing the users to establish the structure of input fields for evaluation. In FIG. 9, the users have established the use of quotation marks for text entry and a specific input style for the citation of prior art patents. Images may also be input into the system as bitmaps, jpegs, pdf's, xps, etc.

With reference to FIG. 10, a user of the system is presented with a screen such as depicted in FIG. 10 during the process of reviewing and analyzing information sources for the presence of disclosure pertaining to the established concepts. In the case of a patent analysis project this could be, in the case of an invalidity analysis the disclosure of various prior art references. If an alternative type of project were being undertaken, for example an infringement analysis, the information sources to be compared to the concepts would be documents describing an accused product or system. In the case of a claim construction or section 112 support analysis, the information sources could be the specification of the target patent, the file history of the target patent, declarations by experts or inventors and even other prior art references themselves referred to in the prosecution history.

Prior to being presented with this screen, the users (preferably the user that uploads the information source to the system) enter into the system the appropriate bibliographic information associated with that information source. Such information includes, but is not limited to, the author, the full title, a short title, the publication date, evidentiary sponsors, the publication date, the confidential status of the document, bates stamp ranges, the source of the document, etc. In the case of an invalidity or unpatentability reference, the system can track the relevant section of 35 USC §102; in the case of an infringement document, the system tracks the relevant section of 35 U.S.C. §271 and the "model" or "version" of the accused product or service. Additionally, the users of the system can upload one or more copies of the document to the system along with further descriptions or notations (e.g. "best copy available," bates stamped, redacted, etc.).

Moving across the top of FIG. 10, the first box that is highlighted is the reference serial number. The system preferably assigns each information source with its own serial number. The printer icon next to the text allows the user to print a paper (or electronic) copy of the reference for review. The other boxes running along the top of FIG. 10 correspond to groupings of concepts that have been previously established, with the exception of the "General" tab, which is where the reviewer can enter in the appropriate bibliographic information pertaining to the information source. The check marks depicted next to each tab title indicate that the user has saved some information pertaining to those tabs and their respective concepts to the system. The tab entitled "Protocols" is highlighted currently and this indicates that the user is entering information pertaining to the concepts grouped under "Protocols." Below the tabs is a "Documents edit" link, which allows the user to manage the document associated with the serial number 51. To the right, the system presents links associated with all of the documents associated with this reference, its title and its status—in this case, public.

Importantly, multiple documents may be associated with the reference serial number 51 for various reasons. Often, in the case of a litigation a document may be produced multiple times with multiple bates numbers. It may be desirous for the system to track each copy of the document. Other times, particular with respect to older informational sources, various copies may be better or worse—even in part—in terms of legibility. Finally, it may be the case that the users of the system may decide that multiple documents should be treated as a single reference for purposes of the project. This might be because the documents represent, for example, multiple office actions and responses in a patent prosecution file or multiple documents describing a single public use or on-sale bar.

Below is the "save concept information" and "cancel" buttons, which have the same function as described above. It may be preferable in the system to present multiple instances of this functionality, for example at the top and bottom of the screen—particularly where a large number of concepts are grouped together under a single heading.

Below these items in FIG. 10, the user is presented with the concepts themselves and several boxes and buttons for data input. To the left is a radio button or check box that indicates that the information source discloses that concept. Preferably, the system will automatically activate that box or button if the user enters any information in the data boxes. Alternatively, it may be preferable for the system to not activate that button until all information is appropriately entered as a failsafe.

The larger data entry box permits the user to copy or manually enter disclosure from the information source. The smaller data entry box permits the user to enter a specific citation for that disclosure. The system preferably ensures that whatever citation convention has been established for this project is followed before letting the user save the information. If the user finds the concept difficult to follow or wishes to review actual examples of claim language, the system presents that information if the "view associated claims" link is clicked. This information also preferable indicates the claim numbers associated with that limitation.

If multiple disclosures in an information source disclose a concept, the user has the ability to create additional data entry boxes so that each disclosure has its own data entry boxe associated with it.

A reviewer thereafter reviews each individual reference and enters into the system those portions of the document that correspond to each of the aforementioned concept phrases that appear within. The entry of this information can be manually typed into the system, cut and pasted or dragged and dropped using any one of several methods well known to those of skill in the art. One preferable mechanism for entering information can employed using the Tabulaw software, for example. Accordingly, the entered information may be text, hypertext, or images. Further, the system tracks relevant citation information, e.g. in the case of a patent document the relevant column and line number or figure number, in the case of an article the page number, or in the case of a website the URL information.

In addition, the system allows the reviewer to categorize each individual entry of information. If an invalidity or infringement analysis is being performed, the system allows the reviewer to choose between multiple levels of importance—express, inherent, sufficient, similar, etc. Alternatively, the system can simply rank a disclosure on a numerical scale. Any type of custom tag can be generated pursuant to the needs of the users. If no disclosure for a concept exists within a particular document, depending on the parameters set by the users of the system, then that concept can simply be left blank. Additionally, the system provides for the entry of free-form arguments in the same or a separate field if the disclosure of the document requires some explanation as to how it meets the concept phrase.

Additionally, the system provides for the entry of language that could be useful to provide a "motivation to combine," for use in a later obviousness combination. Additionally, the system can provide a field for reviewers to provide a more subjective evaluation of the document. For example, the system might provide for a numerical ranking of the document's subjective value for a jury presentation, where a higher ranking would be given to documents that were clearer and more digestible by a layperson.

It should also be noted that the system will permit text to be formatted in any way that the users desire. For example, the system can bold, underline and italicize just as any word processor and also may permit color text, highlighting and the manipulation of fonts. This can be particularly useful when a disclosure involves a large quantity of text. Additionally, the users of the system are not limited to simply entering text into the system, as stated above, the system also associates images with the concept, in any image format supported by the browser—such as jpeg, bitmap, pdf, xps, etc. It is even possible to associate audio and video clips with a concept or other types of data files. What type of data may be entered into the fields and associated with concepts may also be different for different users with different levels of access. In this example, the system only permits the users to upload images by clicking on the appropriate link.

The system may also preferably provide an electronic version of the information source to the user when the user is entering a disclosure (excerpts) of the information source into the system. The user may drag and drop disclosures of the information source into a concept field. Alternatively, the system may present the user with fields not associated with any concepts and permit the user to designate specific concepts that are to be associated with the data entered into the field(s). In this manner, multiple concepts may be associated with the same information source excerpt and corresponding citation, without having to place the excerpt and corresponding citation in each concept/citation fields appropriate to the information source excerpt. As a further alternative, once a concept/citation field contains an excerpt for an information source, the system may be configured to permit the user to identify other concepts for which the same information source excerpt applies. These latter two alternatives provide the advantage of not duplicating the information source excerpts output in charts or reports. For example, if two concepts are each linked to the same information source excerpt, and a report or chart requires a output for both concepts, the system would preferably only output the information source excerpt once from either concept because the output would be the same for each concept. The system need not present redundant information already supplied by one of two concepts having the same information source excerpt.

As users review information sources, they may also mark the sources as in progress, incomplete or complete to signify to other users of the system that they should either review the reference or not review the reference accordingly. Once marked complete, users with higher levels of access may review the inputted information and make changes as appropriate. Once satisfied, a particular reference may be locked down by the users of the system and closed to further editing. Later, a reference may be unlocked again for further editing.

It is also preferable for the system to track and display to certain levels of users which user has uploaded a particular information source, reviewed a particular information source, edited the data entries or marked an information source as complete. This type of information can be used to gauge productivity of users, manage the review process and as will be further discussed herein allocate bonuses, incentives and awards (or demerits, etc.) to the various individuals involved in a project. Such tracking information may also track mouse clicks, keyboard use, etc., and other standard tracking measures for such purposes as well.

With reference to FIG. 11, a user with sufficient access to the system can generate reports, charts or data visualizations or run experiments at any time during the project. FIG. 11 depicts the presentation of a chart generation wizard in accordance with an embodiment of the present invention. The user may select the type of chart that is desired to be generated. In this instance, the radio button is selecting "claim limitations showing corresponding references" which is a \ shorthand form of chart that simply shows the references that, based on the review of the users, discloses limitations.

Any other conceivable type of chart is possible, but the system illustrated by FIG. 11 depicts two other common and useful charts that the system of the present invention may generate for data mining purposes. First, a table mapping claim limitations to references in a standard two-column invalidity chart that is well known to patent practitioners and litigators. Second, the system is also displaying an option to build a §102/§103 combinations chart. This type of chart lists all references that disclose the limitations of the selected claims (below) either alone or in combination with other references. In the case of combinations, the system will create a chart that shows each viable combination, rather than simply all possible 2-way, 3-way, 4-way, etc., combinations. While other charts, reports and data mining and experimentation is possible, FIG. 11 reflects a user of the system that does not have the correct type of system access to view those options.

In the lower section of FIG. 11, the user may select the claims that will be analyzed as part of the chart-building process. Claim dependences, or multiple/conditional dependencies would also preferably be displayed here. Once the user is satisfied, the user clicks the "build chart" button and a radio button corresponding to the desired output format. In FIG. 11, those output formats are word documents or simply displayed on screen in the user's browsers. Any other type of document or image format may alternatively be selected, such as pdf, WordPerfect, tiff, xps, etc. depending on the setup of the system.

FIG. 12 depicts another example of chart-building according to an embodiment of the invention. In this type of chart-building, the user can select whether to see the "text/ citations" or only "citations." In this embodiment the user can also determine certain formats for the chart-build, such as whether portrait or landscape is desired. It is also preferable that the system enables the users of the chart to build charts for the purpose of submitting or serving in the course of a litigation or a USPTO proceeding. In that instance, the system may allow users to specify a particular format designed to be as compliant as practical with a given court or agency's rule set—for example, if the users select the Central District of California as an output format, the system will build the chart using the lined and numbered pages required in that jurisdiction.

This allows a user to not only build charts, but to run certain experiments on the data set. For example, a particular reference might be excluded due to late production or discovery, and the users can determine the impact that this would have on a case. Alternatively, users can eliminate references known to be weaker or cumulative.

FIG. 12 allows the user to preferable select up to 40 claims and up to 40 references (or other predetermined limits) for the chart build. These limits can be set to ensure that the browser and the system memory is not exceeded and alternatively to ensure that the output is manageable. In a patent project with a large number of claims and a large number of references, the reports and charts that can be generated by the system can easily reach several thousand pages in content.

Figure 13:
FIG. 13 is a screenshot of an advance search screen in accordance with an embodiment of the invention.

FIG. 13 depicts an exemplary "advanced searching" screen that a system of the invention might present to users with sufficient access. Here, the users can run analysis, build charts, engage in data mining or visualization by controlling various assumptions and examining the resulting data. For example, the user might do a free form text search to determine if some specific language appears in any reference. This search might be a "natural language" search or consist of Boolean searching of the types familiar to those of ordinary skill in the art. Alternatively, or conjunctively, the user may experiment by setting date limits. This is particularly useful in, for example, an invalidity project, where the possibility of a pre-filing priority date exists. The experiment might specify that only references or information sources having particular characteristics should be analyzed by the system—for instance, a specific concept or a specific status (e.g. public, confidential or either).

FIG. 14 depicts a portion of the output of an exemplary chart build of the system of the preferred embodiment of the present invention. In the left hand column of the chart the claim language appears. In the right hand column disclosure from the information sources or, in this instance, prior art references are presented. Each reference is headed by its name—e.g., "Spaar" or "Ferrone" and what follows are (in this instance) quotations and citations from the respective references. Note that in the instance of the Ferrone disclosure, the system breaks the limitation into two separate quotations and citations, as the input by the users was in that form. This could correspond to two disclosures of the same concept in the information source. Alternatively, this could correspond to disclosure of two different concepts in the same information source.

FIG. 15 depicts a type of chart built by the system of the preferred embodiment of the present invention. In this instance, the system has at the direction of the user generated a list of the information sources relied upon in the chart building process—in this instance, separate items of prior art. The bibliographic information stored as part of the review process is organized as part of the chart, which itself can be ordered alphabetically or chronologically, etc. This chart is also built using the Central District of California format, as can be seen by the line numbers on the left hand side of the page. Information of this type is commonly required in expert reports or invalidity contentions generated during the course of litigation in many jurisdictions, such as the Eastern District of Texas.

FIG. 16 depicts another type of chart generated in accordance with an embodiment of the present invention. In this instance, the system—at the direction of the user—has generated a chart that simply identifies in chart form the anticipatory (disclosing all claim concepts/limitations) references and viable combinations relied upon by the users for a particular selected claim, in this case claim 1. With respect to combinations under the heading §103, only 2-way combinations are depicted; however, the system can be directed to generate all of the viable 3-way, 4-way or 5-way, etc., combinations (and of course, other types of corresponding charts).

FIG. 17 depicts one exemplary type of data mining or data visualization that can be performed by the system of the present invention. In this instance, the system has generated a "strike chart." For simplicity sake, this particular strike chart is limited to a single claim of a single patent and only four information sources (e.g. prior art references). As one of ordinary skill in the art will appreciate, many more claims and many more prior art references can be utilized in this (and other) forms of visualization.

With reference to FIG. 17, the user is alerted to the target patent by way of the title heading and is given the option of pulling up the patent with the "read patent" link. The user may also open up specific information sources by clicking on the check boxes, which will take the user not only to the data entered into the system, but the raw document preferably.

Each claim limitation 1[a] through 1[e] is separately broken out with its associated concepts. If desired, the user can read a specific limitation by clicking on the corresponding link. In the rightward columns, a check-box appears corresponding to specific information sources that disclose that concept. For example, the "Goodall" information source discloses the concept "Cargo Load: vehicle cargo" and "Vehicle: motor vehicle", but not "Vehicle: vehicle tip over condition." That concept is only found in the Kyrstos information source. Using this type of chart, the user with access sufficient to generate the chart may quickly determine what references are actually disclosing, which references are weak, where weak points in the data set exist and accordingly what references will be crucial and what references will be merely cumulative. For example, the user of the system can quickly see that the Hagenbuch '835 reference is not disclosing any limitation not disclosed in more robust information source. Based on this information, a user might decide to eliminate Hagenbuch from further consideration in the project, all other factors being equal.

As stated above, once review of documents is under way the system can be used to perform logical analyses on the pool of reviewed documents, generate reports, and generate draft legal documents such as infringement or invalidity contentions, claim charts and even draft reexamination requests based on a set of available templates. For example, the users of the system can generate draft invalidity contentions into a template generally corresponding to the requirements of the Eastern District of Texas. Perhaps a more typical type of report would be the familiar claim chart, which correlates the limitations of a claim or claims to the disclosures of a document or documents.

Alternatively, queries can be performed on the database of the system across many different variables. For example, queries can be run based on the type of document. In the context of unpatentability, for example, the system can be queried over only patents and printed publications. Alternatively, in the context of invalidity, documents describing public uses (for example) or confidential documents can be queried. As another example, queries to support many "what-if" scenarios can be run. For example, queries can be run using multiple "priority dates" of the targeted patent documents. Other queries can be run using only certain types of invalidity or unpatentability references—for example, those that satisfy the requirements of 35 U.S.C. §102(b). In an infringement context, queries can be limited to document sources (for example target companies' own websites or specifications), can be limited to a particular type of infringement (direct, induced, contributory), or can be limited to certain versions or models of accused products, among other possibilities.

Other types of reports can also be generated. Reports can be generated in the form of simple document counts—i.e., the numbers of documents that disclose particular concepts or limitations. Such reports can be employed by the system users to guide further searching and analysis. As new documents are reviewed and updated, any report or chart can be re-generated to assist in tracking progress.

Based on the documents' disclosure and the review and analysis by the reviewers, the system can run various processes to assist in determining the "best" documents or combinations of documents for various purposes—infringement or invalidity/unpatentability. In the context of invalidity or unpatentability, the system can determine all of the anticipatory references for a claim or set of claims. Even anticipatory references can be ranked using various optimization algorithms that are known in the art.

As just one example, the system can prioritize documents that "expressly" disclose limitations over those documents that "inherently" disclose limitations. Likewise the system can prioritize documents that qualify as 102(b) references over documents that only qualify as 102(e) references. The system can be instructed additionally to weigh or prioritize documents that disclose certain key limitations or concepts expressly, etc.

As a further example of a ranking algorithm to be employed, the system can be configured to rank or weigh concepts individually for documents and relied-upon disclosures that are associated with concepts. For instance, as above with the "Goodall" information source, consider again that Goodall discloses the concept "Cargo Load: vehicle cargo" and "Vehicle: motor vehicle", but not "Vehicle: vehicle tip over condition." As in the example, the concept of "Vehicle: vehicle tip over condition" is only found in the Kyrstos information source. Although Goodall discloses the "vehicle cargo" concept, further information can be associated with this concept using a linked attribute referred to as Strength of Disclosure or Core Rating for the disclosure. Using variables to express how exact the disclosure of Goodall is for the "vehicle cargo" concept, further useful information can be captured for later analysis.

Figure 18:
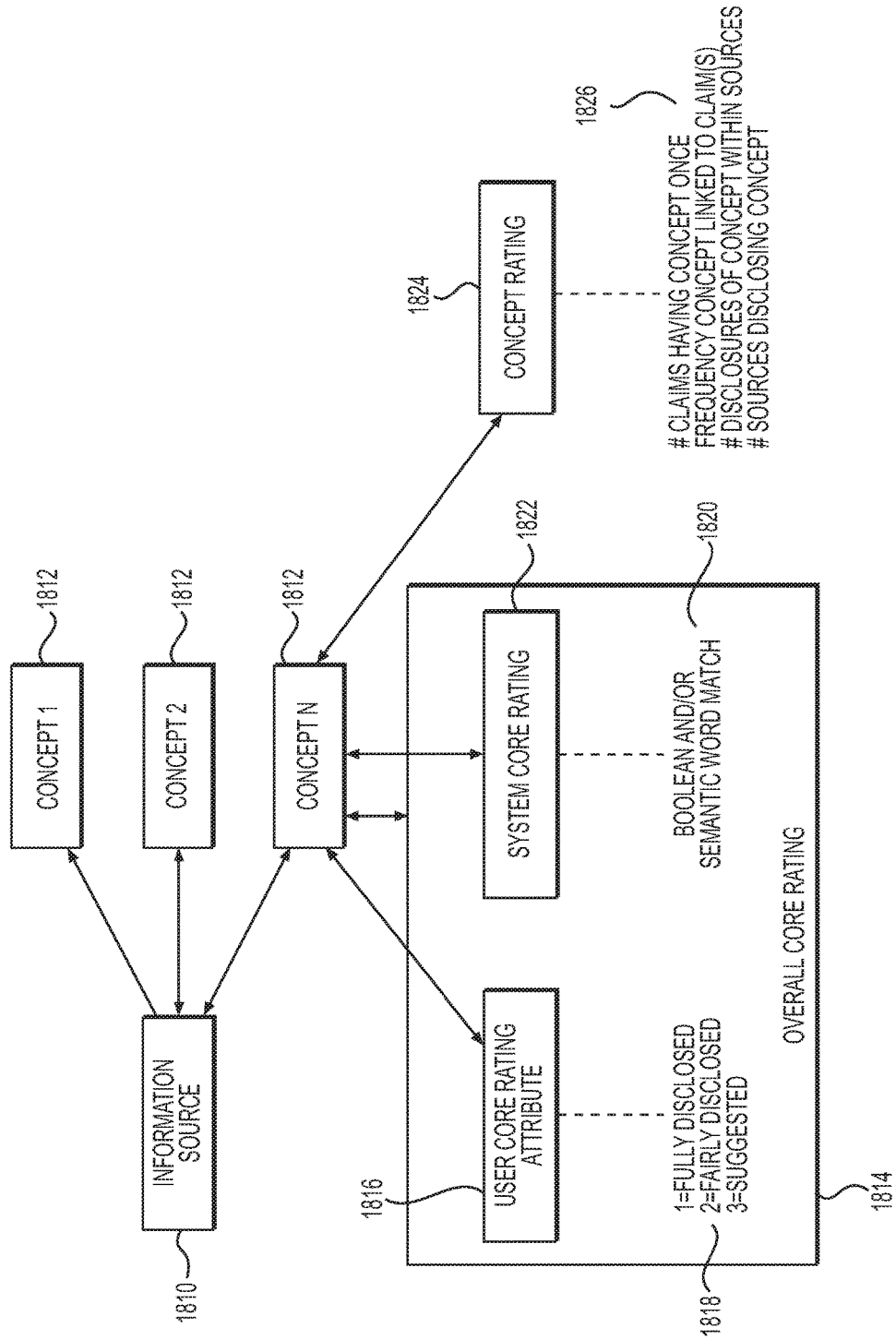
FIG. 18 is an illustration of various information and concept rating criteria.

In accordance with FIG. 18, consider the non-limiting example whereby the Core Rating 1816 has three ranks, understanding that additional ranks are possible, may be desirable, may vary from case to case, and may be specified by a user through the case management portal. With Core Rating ranks 1818 of (a) fully disclosed; (b) fairly disclosed; and (c) suggested by reference, the system can utilize the Core Ratings 1816 to rank references identified as 102 and 103 references against a claim, or identify the most useful information pertinent to a user query. The concept of inherency of disclosure might likewise be incorporated into the system.

With respect to the illustration of different ratings and their relationships with concepts in FIG. 18, in the case of invalidity by anticipation, consider that a claim requires ten concepts. If a single information source 1810 were found to teach each of the ten concepts of a claim, the information source 1810 would be understood to anticipate that claim. By applying the additional data provided by Core Ratings 1816, 1822 for each of the ten concepts, the information sources 1810 may be ranked. For example, an information source 1810 having six concepts 1816 each with a rank 1818 of "fully disclosed", and the remaining four concepts necessary for the claim having the lesser rank 1818 of "suggested by reference", a particular information source 1810 may be considered a more suitable anticipation information source than an information source whereby four concepts had the secondary rank 1818 of "fairly disclosed" and six concepts had the tertiary rank 1818 of "suggested by reference." Using the subjective Core Rating 1816 for each concept, and a matching algorithm to determine whether an information source discloses the specified concepts of a claim, provides incremental insight into how information sources rank relative to one another.

In an alternative embodiment, the System Core Rating 1822 for each concept may be automatically applied by the system according to a Boolean or semantic match between the words of the concept and the disclosure from the information source set forth by the user for the concept. It is to be understood that the concept is represented by words, and that additional words, including notes or other words of guidance, may also be linked to each concept as an additional aid during the review stage. The additional guidance language associated with each concept may also be considered together or separately with the words of the concept itself for purposes of evaluating a Boolean or semantic match. By way of example only, FIG. 6A reflects a relationship between fields for a concept and its respective notes. In a further alternative embodiment, there could be a User Core Rating 1816 (subjective) and a System Core Rating 1822 (objective based on Boolean and/or semantic word match), to generate an Overall Core Rating 1814 for each concept 1812 disclosed by an information source 1810. Many different variations of how to apply, adjust and establish Core Ratings for concepts are contemplated.

Another approach to applying rating data for ranking information sources includes a consideration of how many information sources disclose a particular concept. For example, again with respect to the illustration of ratings and concepts in FIG. 18, consider a set of 20 information sources 1810, each disclosing several of a possible fifteen concepts 1812. A concept 1812 disclosed by the fewest number of information sources, or alternatively, with the fewest number of total disclosures (understanding that a concept may be disclosed more than once by any information source), may be understood to be more important based on the lower frequency of its disclosure compared with other concepts. Further, although a concept may only be disclosed by information sources a small number of times, the concept may only be associated with two claims of a twenty claim set. With this understanding, the concept may not be considered as important compared to a concept that is required by all twenty claims of a twenty-claim set. Appropriate Concept Ratings 1824 can be attributed to concepts based on some or all of the following factors 1826, among others: the number of claims specifying a concept at least once, the total number of times a concept is specified by a claim or the entire claim set, the total number of disclosures of the concept by information sources, and the total number of information sources disclosing the concept at least once.

By characterizing a concept by a Concept Rating 1824 and characterizing a concept's disclosure by an information source 1810 as an aggregate Core Rating 1814, various algorithm-based rankings can be performed using these ratings, with adjustments possible to emphasize the importance of the various rating factors, to provide for relative rankings of the information sources in the context of anticipation and obviousness contentions. Applying the Concept and/or Core Rating values to anticipation and obviousness results output by the system can allow the system to filter or identify the most appropriate information source, or combination of information sources, appropriate to meet the concepts specified for a particular claim.

For example, information sources with a relatively high Core Rating (more instances with fully disclosed concepts and/or system core rating, yielding a higher overall core rating), may be considered more appropriate for both anticipation and obviousness challenges. An information source may also be perceived as more appropriate for an invalidity challenge because its concept rating demonstrates that it discloses a particular concept that is rarely disclosed in other information sources, contains a large number of instances of disclosures of that rarely disclosed concept, and further that the particular concept has a high frequency of appearing in particular target claims. Moreover, the system may reveal, via the Reference Ranking Module, that this particular rarely disclosed concept has a high overall core rating, because it either was marked as being "fully disclosed" (User Core Rating attribute) or has a high correlation with a matched disclosure for the information source (System Core Rating), or both (Overall Core Rating). It should be appreciated that a user may find different rating attributes to be more important depending upon the subject matter, the expertise of a user evaluating an information source for disclosure, and/or the complexity of the claims and related concepts.

In another respect, a concept rating need not be an aggregate value, but rather may be represented by multiple separate values associated with the frequency values discussed above. Discrete, Concept Rating sub-values provide a mechanism for further differentiation in the various operating modules. For invalidity contentions, a crowd-sourced prior art search may be initiated following a prior art review and categorization using this system whereby a search is principally directed to locate one or more concepts having a low number of disclosures of that concept(s) within sources and/or a low number of sources disclosing the concept. Differentiation among the concepts for searching purposes can be further delineated by considering how many claims recite the concept and further how frequently the concept is linked to claim limitations in one or more claims. An additional filter parameter for determining concepts to search, via the crowd-sourced approach or otherwise, may be based on the Overall Core Rating, User Core Rating and/or System Core Rating for a concept.

Separate from the alternative embodiments using Concept Ratings and/or Core Ratings, the system can also generate comprehensive reports regarding obviousness. Rather than generating all mathematically possible combinations of the reviewed documents—which for even a modestly sized database of 10 documents would grow prohibitively large—the system may return only plausible combinations that provide claim coverage within certain selected parameters. For example, the users might query the system to generate all 2-way combinations based on 102(b) art for a select set of identified claims. Broader or narrower parameters can be selected as desired.

Another type of useful data mining and visualization aid that the system can generate is the heat map. A heat map is well known generally speaking to those of skill in the field of data visualization and is often used, for example, in securities trading to help users identify potential opportunities in a market. Here, the system of the present invention uses this type of visualization—using colors from deep purple to white hot—to represent the frequency or lack thereof of disclosure covering claims, claim limitations and concepts. For example, in a situation where more references disclose a particular concept, the heat map might display that fact to the user by a color associated with a higher heat value. If a concept or claim or claim limitation has fewer (or no) disclosures from the information sources (e.g. prior art references) then the user is presented a lower heat value color. This heat map can also be run in accordance with the various experimental searches and reports discussed above. This allows users with sufficient access to very rapidly determine where potential weaknesses exist, so that searching can be specifically directed thereto or project strategy can be otherwise adjusted.

It is also possible for the system to generate more sophisticated reports that can take the form of more complex and complete documents. For example, if the system has been capturing the arguments and explanations associated with disclosure of concepts in various information sources along with motivation to combine information, then the system can generate draft reexaminations of patents and selected claims using selected items of prior art. While such a document should be reviewed and later edited, a great deal of time can be saved in the mechanics of drafting by utilizing the informational advantages of the system.

As stated herein, the system can track users as they enter data or use the system. This can be done to ensure productivity. The system can track users by way of mouse-clicks or keyboard entry, etc., to monitor activity level. The system also tracks what users uploaded data, images and made edits to concepts or the data in a specific field. This user information can be stored over time and optionally across projects. Users with sufficient access can access specialized menus, and features that allow them to track, observe and review other users of the system. This tracking feature optionally can tie into the crowdsourcing aspects of the system of the present invention.

Crowdsourcing is made possible by the cloud deployment of the system and its ability to support multiple users simultaneously. Typically, users of the system might all be employed by the same law firm. In other situations, users might span across several law firms tied together by way of a joint defense group. In these situations all of the users of the system would have access to attorney-client privileged and work product doctrine materials; however, they would be legally and ethically bound to keep such information confidential. However, it is possible for the system to create levels of users that would not have access such protected information. For example, a "bounty hunter" user level might only have the ability to upload prior art for others to review. The system can provide, at the discretion of the case administrators, the ability of third parties to register to use the system for that purpose. Such users could sign confidentiality agreements in exchange for access.

As the system tracks "bounty hunter" users they may develop over time a track record of success in finding quality information sources. Such users may later be promoted to a higher level of user that would have the ability not only to upload items of prior art, but also to enter data into the system.

Higher levels of third party access can grant third party users higher levels of rewards. For example, a bounty hunter might be granted a small reward for uploading an item of prior art that was later reviewed by other users of the system. This would be an indication that the users of the system found this art relevant to the project. If however, the bounty hunter user were to upload an item of prior art that was ultimately included in a reexamination or in invalidity contentions, the reward could be higher. Several bounty hunters might share a reward, as in the instance where an information source was uploaded independently by several users or discovered independently by higher-level users.

The system can also track demerits for such users who waste the time of other reviewers by, for example, inappropriately entering bibliographic information into the system or entering information sources that could not be prior art. After a certain level of demerit, a third party user of the system could be demoted from a higher level of access back down to a bounty hunter level of access or even denied access to the system altogether.

A higher-level third party user to the system might be paid on an hourly basis to review informational sources, provided that a certain level of efficiency is maintained. The system's ability to track mouse movement and clicks as well as keyboard entries, etc. can ensure that the third party user is not scamming the system. Even higher levels of third party access might allow such users to communicate with the case administrators or managers to receive direction or even to manage the lower level of users. Leveraging these features might enable the managers of a project to effectively employ thousands of patent searchers and data entry personnel at a fraction of their current costs.

The system also makes use of a secure billing system. The system can register users from the case administrator level to the third party bounty hunters. The billing system can take credit cards and use those credit cards to receive payment for the user of the system, but also preferably to allow the managers of a particular project to pay the third party users that work on the project.

Although the invention has been described and illustrated herein primarily in the context of patent claim analysis, one skilled in the art will appreciate that the concepts disclosed are further applicable to a variety of applications, some of which are specifically mentioned. Likewise, the figures including screenshots illustrate exemplary options for a user interface, and which while described and illustrated as screens or pages may be variously combined, modified, or otherwise adapted for any environment, including display on desktop, portable, mobile and other devices, processed for audio presentation, etc.

The invention is often described with respect to functional modules. However, the disclosed functionality might be embodied in hardware, software, and/or a combination thereof, and could be offered as a web or cloud-based service, implemented on networked or dedicated servers, on a mainframe, etc. In addition, disclosed modules might be varied in countless ways, for example combining functionality from multiple described modules into a single module, parsing out functionality from a single module into multiple, or incorporating into a module functionality not herein described in the context of a module. Thus, many variations are possible without departing from the scope of the invention.

What is claimed is:

1. A method for ranking the quality of a first information source of a plurality of information sources with respect to a patent claim in a collaboration and analysis system, the first information source having a first information disclosure, comprising:
    storing the plurality of information sources in a database;
    processing a first patent claim to derive a first set of one or more core concepts;
    processing the first patent claim to derive a first set of one or more claim limitations;
    processing a second patent claim to derive a second set of one or more claim limitations;
    processing the first set of core concepts to assign a core rating to each core concept based upon a precision of the first information disclosure of the first information source with respect to each core concept of the first set of core concepts;
    processing a ranking for the first information source to determine a core rating for each core concept of the first set of core concepts for the first set of claim limitations;
    processing at least one association between a claim limitation of the first set of claim limitations and a claim limitation of the second set of claim limitations; and
    processing the second set of claim limitations to assign a second set of core concepts to the second set of claim limitations, wherein the second set of core concepts is based on the first set of core concepts and the second set of core concepts is assigned to the second set of claim limitations based on the at least one association between the first and second set of claim limitations.

2. The method of claim 1, wherein the core ratings comprise a numerical value.

3. The method of claim 2, wherein the numerical value is assigned based upon a determination that the first information disclosure of the first information source with respect to the first core concept satisfies one of: 1) fully discloses the first core concept, 2) fairly discloses the first core concept, and 3) suggests the first core concept.

4. The method of claim 3, wherein the determination that the first information disclosure of the first information source with respect to the first core concept satisfies one of: 1) fully discloses the first core concept, 2) fairly discloses the first core concept, and 3) suggests the first core concept is made based upon an average of one or more disclosure ratings assigned to the first information disclosure of the first information source with respect to the first core concept by one or more users of the system.

5. The method of claim 4, wherein the average is weighted based upon a level of access assigned to the one or more users of the system.

6. The method of claim 1, wherein the core ratings are objectively based upon an analysis of an extent of semantic correlation between words associated with the first core concept and words of the first information disclosure of the first information source.

7. A system for analyzing a first disclosure of a first information source with respect to a first core concept of a first patent claim, comprising:
    a database for storing a plurality of information sources and a plurality of core concepts of the first patent claim;
    a plurality of electrical components comprising a controlled environment for providing a communication engine between a user and the database, the plurality of electrical components including a processor for processing the first patent claim to derive a first set of core concepts, processing the first patent claim to derive a first set of claim limitations, processing a second patent claim to derive a second set of claim limitations, processing the first set of core concepts to assign a core rating to each core concept based upon a precision of the first information disclosure of the first information source with respect to each core concept of the first set of core concepts, processing a ranking for the first information source to determine a core rating for each core concept of the first set of core concepts for the first set of claim limitations, processing at least one association between a claim limitation of the first set of claim limitations and a claim limitation of the second set of claim limitations, and processing the second set of claim limitations to assign a second set of core concepts to the second set of claim limitations, wherein the second set of core concepts is based on the first set of core concepts and the second set of core concepts is assigned to the second set of claim limitations based on the at least one association between the first and second set of claim limitations;
    an analysis interface, forming a part of the communication engine, for correlating data of the system, inputs from a user, and the display of data in cooperation with an analysis interface engine;
    a server for providing to the user access to information of the system; and
    a communication application for coordinating communication between a user device of the user and the controlled environment, for accessing resources through the controlled environment.

\* \* \* \* \*